(12) United States Patent
Munday et al.

(10) Patent No.: US 11,518,620 B2
(45) Date of Patent: Dec. 6, 2022

(54) CONVEYOR MODULE, CONVEYOR ASSEMBLY, AND METHOD OF INSTALLING A CONVEYOR ASSEMBLY

(71) Applicant: NEPEAN CONVEYORS PTY LTD, New South Wales (AU)

(72) Inventors: Bill Munday, Sydney (AU); Tony Perram, New South Wales (AU); David Novak, Sydney (AU); Dean Franklin, New South Wales (AU)

(73) Assignee: NEPEAN CONVEYORS PTY LTD, New South Wales (AU)

( * ) Notice: Subject to any disclaimer, the term of this patent is extended or adjusted under 35 U.S.C. 154(b) by 0 days.

(21) Appl. No.: 17/133,753

(22) Filed: Dec. 24, 2020

(65) Prior Publication Data
US 2021/0114814 A1    Apr. 22, 2021

Related U.S. Application Data

(63) Continuation of application No. 16/349,410, filed as application No. PCT/AU2017/051233 on Nov. 10, 2017, now Pat. No. 10,899,546.

(30) Foreign Application Priority Data

Nov. 11, 2016  (AU) .................................. 2016904604

(51) Int. Cl.
| | |
|---|---|
| *B65G 21/02* | (2006.01) |
| *B65G 21/10* | (2006.01) |
| *B65G 41/00* | (2006.01) |
| *B65G 21/06* | (2006.01) |
| *B65G 21/14* | (2006.01) |
| *B65G 15/30* | (2006.01) |

(Continued)

(52) U.S. Cl.
CPC ............. *B65G 21/06* (2013.01); *B65G 21/14* (2013.01); *B65G 41/005* (2013.01); *B65G 15/30* (2013.01); *B65G 17/28* (2013.01); *E21F 13/08* (2013.01)

(58) Field of Classification Search
CPC ......... B65G 21/02; B65G 21/10; B65G 41/00
USPC ............................... 198/860.1, 860.5, 861.1
See application file for complete search history.

(56) References Cited

U.S. PATENT DOCUMENTS 5,680,925 A * 10/1997 Gallagher .............. B65G 15/00
198/861.1
5,979,642 A * 11/1999 Hall ....................... B65G 21/14
198/309

(Continued)

*Primary Examiner* — Douglas A Hess
(74) *Attorney, Agent, or Firm* — Leason Ellis LLP

(57) ABSTRACT

A conveyor module 1, adapted to be releasably attached to at least one other conveyor module 1 to form a conveyor assembly 15. Each conveyor module 1 includes a substantially longitudinal main frame 4, said main frame 4 being adjustable between a first position (FIG. 3), in which said module 1 is compacted for transportation, and, a second position (FIG. 4), in which said module 1 is expanded for conveyor operation. A plurality of support legs 17 is provided to support said conveyor module 1 upon a substrate surface, each support leg being adjustable to facilitate adjustable alignment of said module 1. Conveyor componentry 12 is housed substantially within said main frame 1. The conveyor module 1 is preferably formed from or built to standardised shipping container (ISO) specifications.

2 Claims, 44 Drawing Sheets

(51) Int. Cl.
*B65G 17/28* (2006.01)
*E21F 13/08* (2006.01)

(56) References Cited

U.S. PATENT DOCUMENTS

| | | | | |
|---|---|---|---|---|
| 6,427,831 B1* | 8/2002 | Norton | ............ | B65G 21/06 198/841 |
| 6,769,536 B2* | 8/2004 | Lutz | ............ | B65G 21/06 198/465.1 |
| 7,753,194 B1* | 7/2010 | Jager | ............ | B65G 21/02 198/861.1 |
| 7,775,343 B2* | 8/2010 | Kemph | ............ | B65G 37/00 198/754 |
| 8,393,456 B2* | 3/2013 | de Lore | ............ | B65G 15/00 198/313 |
| 8,439,180 B2* | 5/2013 | Zhang | ............ | B65G 63/025 198/369.5 |
| 8,915,691 B2* | 12/2014 | Mintz | ............ | B65D 88/30 414/305 |
| 8,960,419 B2* | 2/2015 | Kennedy | ............ | E21F 1/145 198/860.1 |
| 9,469,480 B2* | 10/2016 | Gibbs | ............ | B65G 39/125 |
| 10,189,599 B2* | 1/2019 | Allegretti | ............ | B65D 90/14 |
| 10,434,923 B2* | 10/2019 | Baker | ............ | E05D 5/0207 |
| 10,562,713 B2* | 2/2020 | Smith | ............ | B65G 39/04 |
| 10,899,546 B2* | 1/2021 | Munday | ............ | B65G 21/14 |

* cited by examiner

CONVEYOR MODULE, CONVEYOR ASSEMBLY, AND METHOD OF INSTALLING A CONVEYOR ASSEMBLY

CROSS-REFERENCE TO RELATED PATENT APPLICATIONS

This is a Continuation of U.S. application Ser. No. 16/349,410, filed May 13, 2019, which is a U.S. National Phase Application under 35 U.S.C. § 371 of International Patent Application No. PCT/AU2017/051233, filed Nov. 10, 2017, and claims priority to Australian Patent Application No. 2016904604, filed Nov. 11, 2016, each of which is incorporated by reference in its entirety. The International Application was published on WO2018085891, as International Publication No. May 17, 2018 A1.

BACKGROUND OF INVENTION

The present invention relates to a modular conveyor system, and in particular, to a conveyor module and associated support frame which may be easily transported and installed with other such conveyor modules and frames to form a conveyor assembly.

DESCRIPTION OF THE PRIOR ART

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

Conveyor belt systems used to transport minerals from mine sites are often needed in remote locations where installation and maintenance of conveyors may be challenging. Installation of conveyor belt systems is quite often difficult and costly, as significant earthworks may be required, and, labour may be scarce and/or skilled. Furthermore, after operation of such a mine ceases, or the location of mineral extraction changes, conveyor belt assemblies may typically be required to be de-mobilized. However, such known conveyor systems are typically not readily relocatable.

SUMMARY OF THE INVENTION

The present invention seeks to overcome at least some of the disadvantages of the prior art.

The present invention seeks to provide a conveyor module which may be utilized with other such conveyor modules to form a conveyor assembly which is, due to its modular form, is more easily and less expensively installed than the aforementioned prior art conveyor systems.

The present invention seeks to provide a modular conveyor system which is optionally reusable and relocatable to a different geographical position when the conveyor system is no longer required at the original location.

The present invention also seeks to provide a modular conveyor system which is dimensioned in a standardized modular size in the form of an intermodal shipping container, ISO container or other like container, and such that it is compatible to be readily transported via ship, train or truck.

The present invention also seeks to provide a conveyor system which may be prefabricated then transported to the location ready for use and already incorporating many/all of the conveyor componentry therein such that it may then be commissioned by relatively simple non-specialist personnel ready for use. Likewise, the system may be decommissioned with non-specialized labour and tools and then removed to an alternative location, if required.

In one broad form, the present invention provides a conveyor module, adapted to be releasably attached to at least one other conveyor module to form a conveyor assembly, said conveyor module including:
  a substantially longitudinal main frame, said main frame being adjustable between:
    a first position, in which said module is compacted for transportation; and,
    a second position, in which said module is expanded for conveyor operation;
  a plurality of support legs to support said conveyor module upon a substrate surface, each support leg being adjustable to facilitate adjustable alignment of said module; and
  conveyor componentry housed substantially within said main frame, said conveyor componentry including any one or combination of:
    a conveyor belt;
    a conveyor belt support structure;
    a conveyor belt idler;
    an adjustable height/width conveyor belt support post;
    a boot end;
    a tail end;
    a loop take up; and,
    a loading hopper.

Preferably, said extension is formed from or built to standardised shipping container (ISO) specifications, such that, in its first position, said module is compatible with conventional intermodal freight transportation modes including by shipping, rail, road or other transportation methods.

Also preferably, said main frame includes a roof, wherein said roof is movable between:
  a first position, wherein said roof is housed substantially within said main frame for transportation; and,
  a second position, wherein said roof extends at least partially outwards of said main frame for conveyor operation.

Preferably, said roof is movable substantially vertically and/or is adapted to substantially horizontally extend at least partially outwards of an end of said main frame by pivoting, folding or the like.

Also preferably, said conveyor componentry includes adjustable mountings to adjustably support said conveyor belt support structure and idler arrangement, said mountings allowing adjustable movement of said conveyor belt support structure between:
  a first position, in which said conveyor componentry is compactly stored when said module is compacted for transportation; and,
  a second position, in which said conveyor componentry is rotated or otherwise unfolded or the like from said stored position to an operational position.

Preferably, when said conveyor belt support structure is in said second/unfolded position, said conveyor components may be further adjusted horizontally and/or vertically.

Preferably, further vertical and/or horizontal adjustment is facilitated using one or more vertical and/or horizontal slots, respectively.

Also preferably, each support leg is height adjustable to facilitate levelling/adjustment of said module.

Preferably, each support leg includes a twist lock fitting to facilitate fixing and release of said module to said support post.

The present invention also provides a plurality of conveyor modules as hereinbefore described.

Preferably, each support leg is adjustable so as to permit angular displacement or articulation between adjacent conveyor modules.

In a further broad form the present invention provides a method of installing a conveyor assembly, including:
positioning one or more support legs in spaced apart location on a substrate surface; and,
spanning a conveyor module between said spaced apart support legs.

Preferably, the method further includes interlocking said conveyor module to said support leg.

Preferably, the method further includes elevating an adjustable height roof on said main frame from a transportation position to conveyor operation position.

Preferably, the method further includes extending a roof, from said main frame, from a first position wherein said roof is substantially housed within or proximal to said main frame, to a second position, wherein said roof extends at least partly outwards of said main frame.

BRIEF DESCRIPTION OF THE DRAWINGS

The present invention will become more fully understood from the following detailed description of preferred but non limiting embodiments thereof, described in connection with the accompanying drawings wherein.

DETAILED DESCRIPTION OF PREFERRED EMBODIMENTS

Throughout the drawings, like numerals were used to identify similar features, except where expressly otherwise indicated.

It should be appreciated also that whilst particular embodiments of the invention, which relate to any one or combination of a conveyor module, a support frame, and a conveyor assembly, together with a method of transporting, installing and operating a conveyor assembly are herein described and shown, these are for exemplary purposes only. The invention should not be limited to these specific embodiments. All such variations and modifications which become apparent to person skilled in the art should be considered to be encompassed within the scope of this invention.

Figure 1:
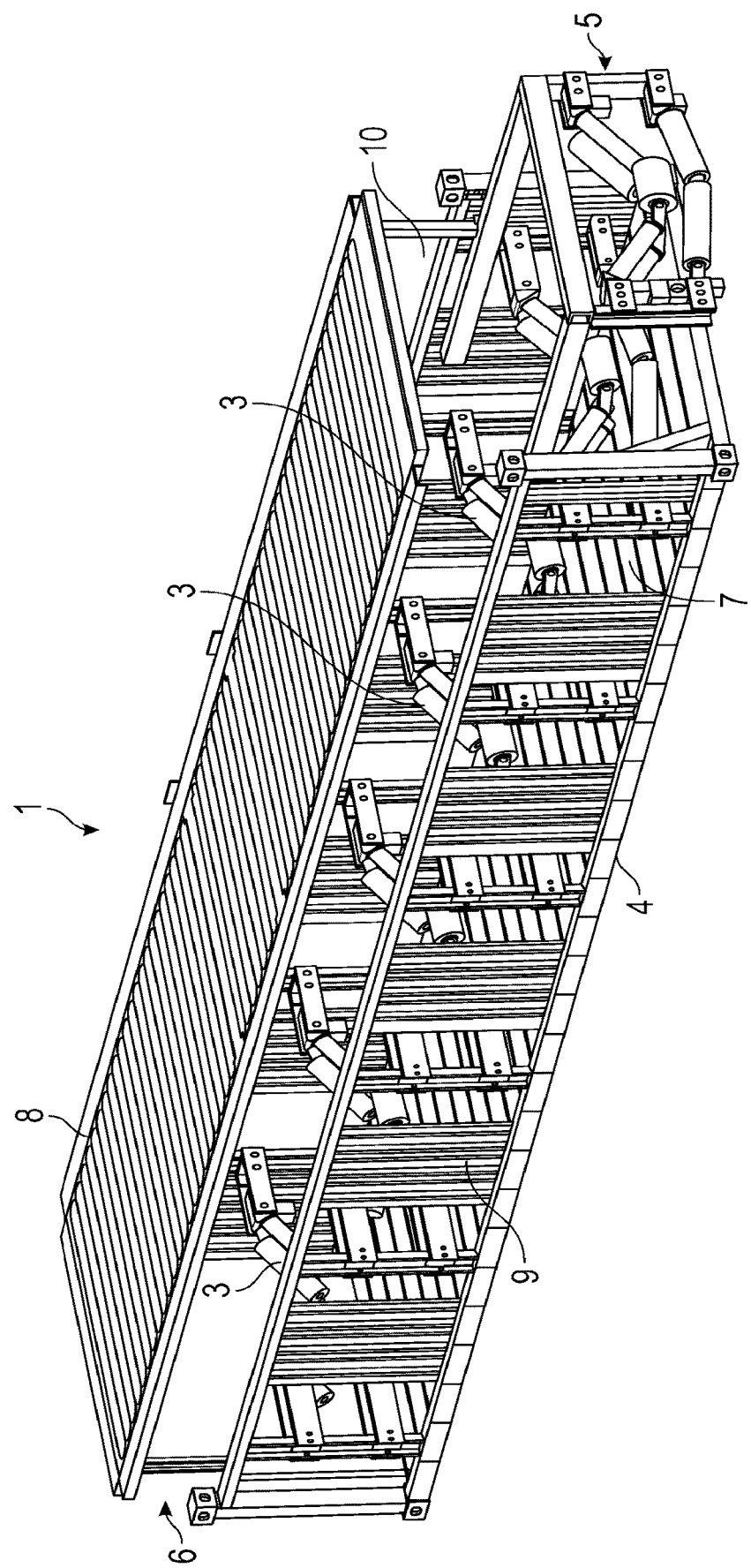
FIG. 1 illustrates an isometric view of the conveyor module incorporating conveyor componentry in accordance with the present invention.

As shown in FIG. 1, the conveyor module, generally designated by the numeral 1, may typically be formed from, or built to be similar to, a shipping container which houses pre-assembled conveyor components.

Persons skilled in the art will readily appreciate that a shipping container has a standardized size which is dimensioned such that it can readily fit on a ship, train, truck, or other mode of transport, and be stacked, along with like containers to store and transport goods domestically and internationally. Such containers are known under a number of names, such as simply "container", cargo or freight container, ISO container, shipping, or ocean container, etc. When referring to the "module" of the present invention, it should be understood that the "module" of the present invention may, in its preferred embodiment, be dimensioned to be equivalent, or at least compatible with, such a standardized ISO intermodal shipping container.

The conveyor assembly of the present invention, is typically formed of a plurality of conveyor idler structures provided in spaced apart location relative to each other. These conveyor idler structures collectively support a conveyor belt, and, are operated by appropriate drive means, etc.

The conveyor module 1 according to present invention shown in FIG. 1, includes a basic module structure being formed of a substantially longitudinal main frame portion 4. The ends 5 and 6 of the longitudinal-shaped module 1 may be substantially open, such that the module 1 may be positioned adjacent similar conveyor modules 1, to thereby effectively form a conveyor assembly of any desired length.

The embodiment illustrated in FIG. 1 shows, a preferred arrangement of a module 1 having a floor surface 7, a roof surface 8, and, substantially open side walls 9 and 10. A plurality of conveyor idler structures 3 are provided in spaced apart relationship within the module 1. As will be understood by a person skilled in the art, such a structure may provide a protection to the conveyor components housed therein from weather, dust and environmental effects, whilst having at least partly open or openable side walls 9 and 10 to allow for visual inspection and/or maintenance access to the conveyor structure.

Figure 2:
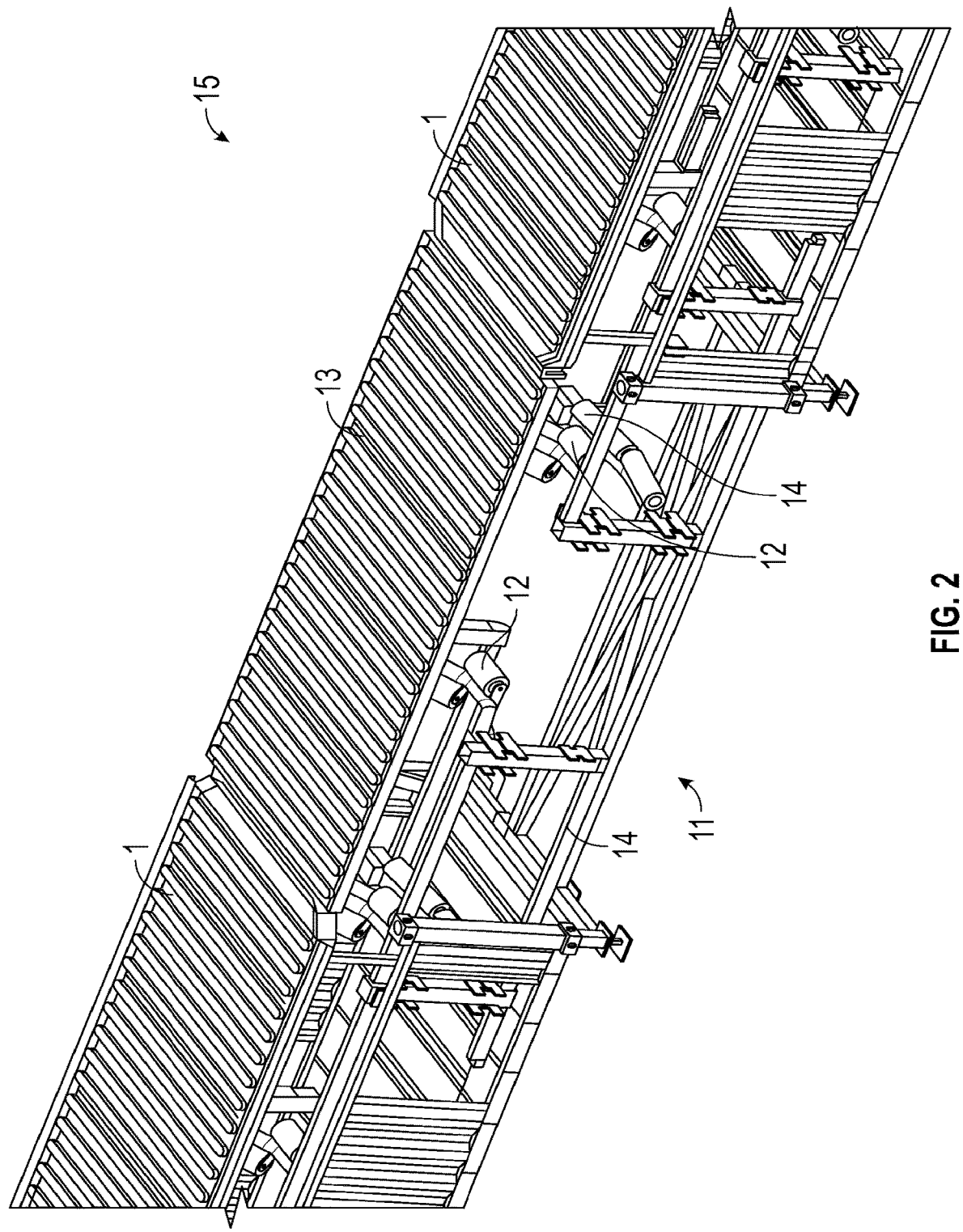
FIG. 2 illustrates an isometric view of two conveyor modules in spaced apart locations to form a conveyor assembly in accordance with the present invention.

FIG. 2 illustrates how two such conveyor modules 1, as shown in FIG. 1, may typically be interconnected via a support frame 11 to effectively join the conveyor modules 1 such that they can function as a composite conveyor assembly 15.

Whilst further explanation will be provided hereafter, FIG. 2 illustrates how idler rollers 12 may extend outwardly from the ends 5 and 6 of the conveyor module 1 to a position above an interconnecting support frame 11, and, how an extension roof 13 may be adapted to extend from one or both ends of the spaced apart conveyor modules 1. Prior to going into the details of how the modules 1 are positioned/installed and then expanded to form the conveyor assembly 15, details of the conveyor module 1 will be firstly illustrated with reference to FIGS. 3 to 6.

Figure 3A:
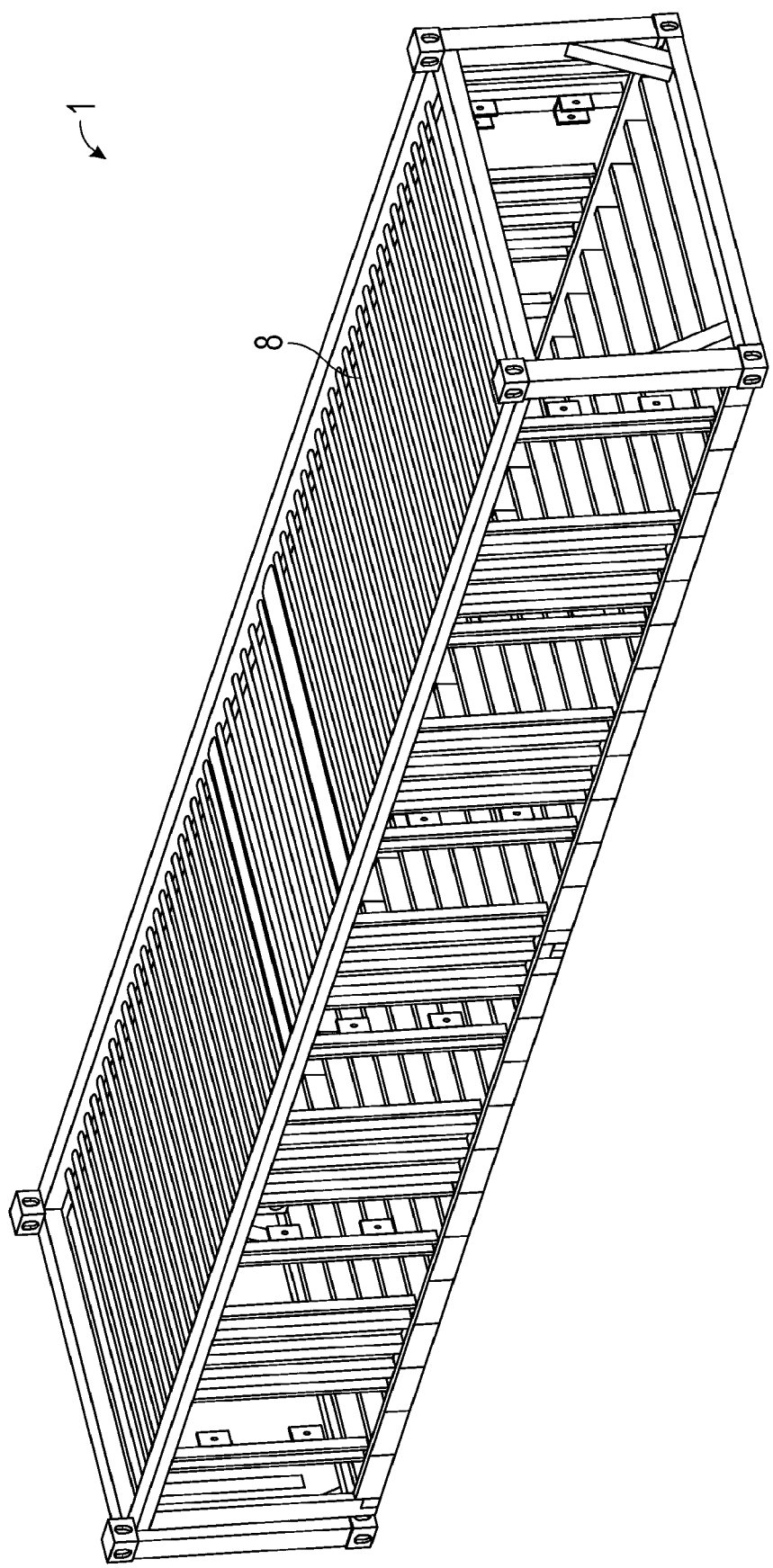
FIGS. 3(a), 3(b) and 3(c) are isometric, side elevation and end elevation views, respectively, of the conveyor module in accordance with the present invention in a first position with its roof lowered and compacted for transportation.
Figure 3B:
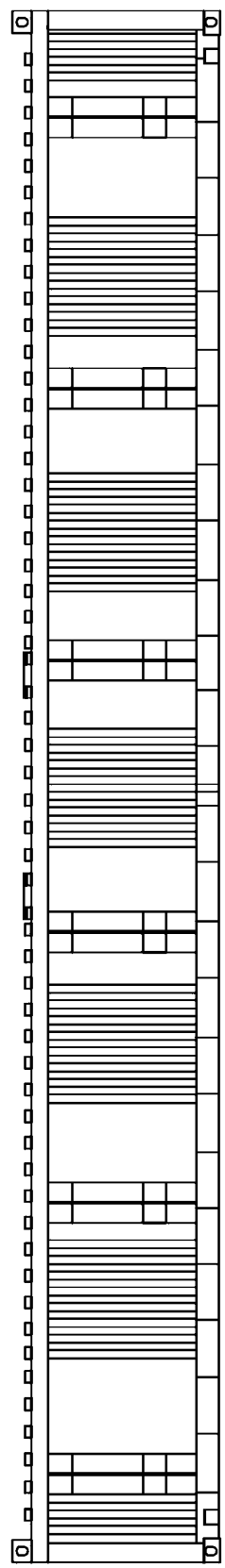
Figure 3C:
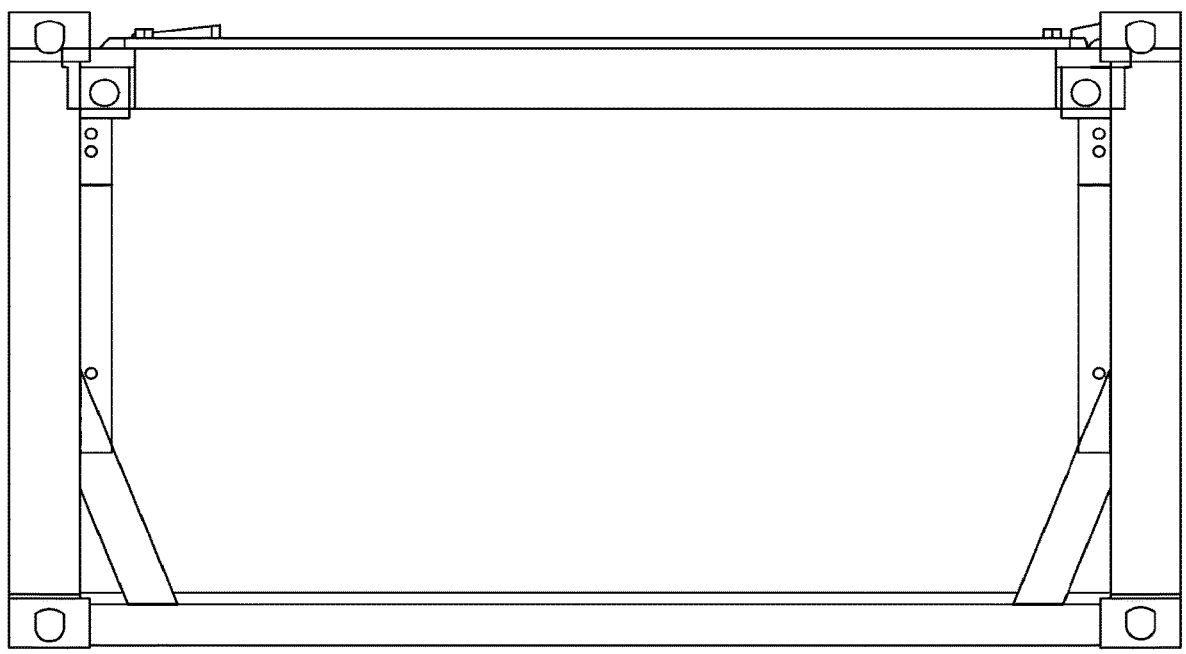

FIGS. 3(a)-(c) show various views of the conveyor module 1 in a first position wherein the roof 8 is stowed in a transport position for compact transportation of the conveyor module 1. FIG. 3(a) illustrates an isometric view of this transport position of conveyor module, whilst FIG. 3(b) illustrates a side elevation view, and, FIG. 3(c) illustrates an end view.

Figure 4A:
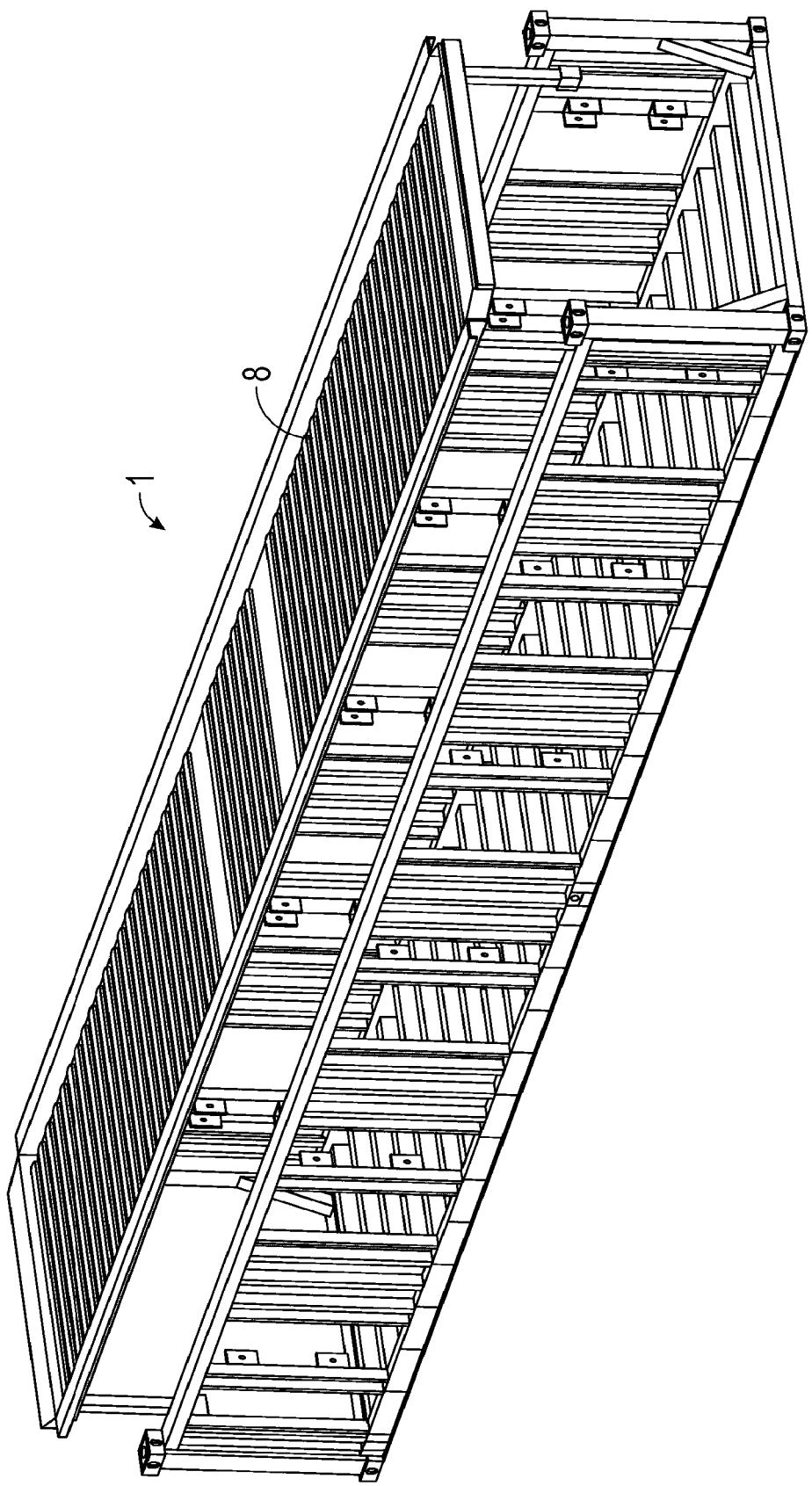
FIGS. 4(a), 4(b) and 4(c) illustrate the conveyor module in a second position where it is expanded with the roof raised for conveyor operation.
Figure 4B:
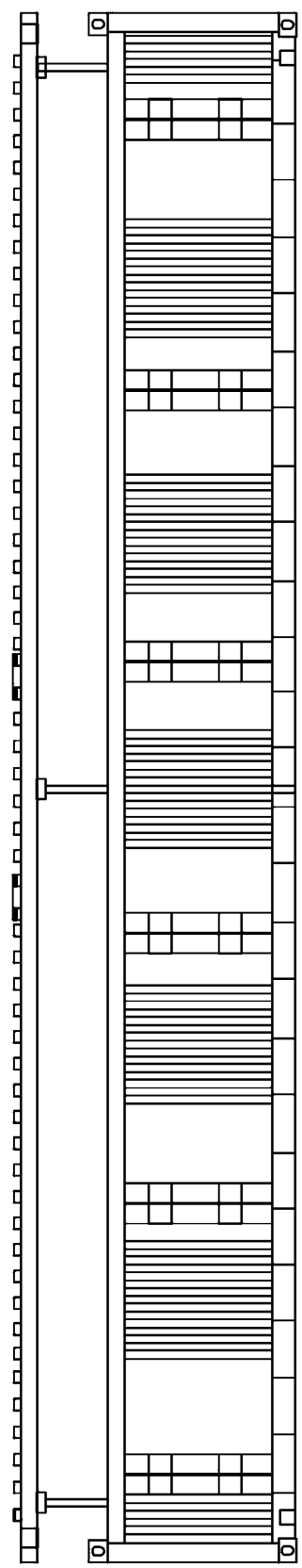
Figure 4C:
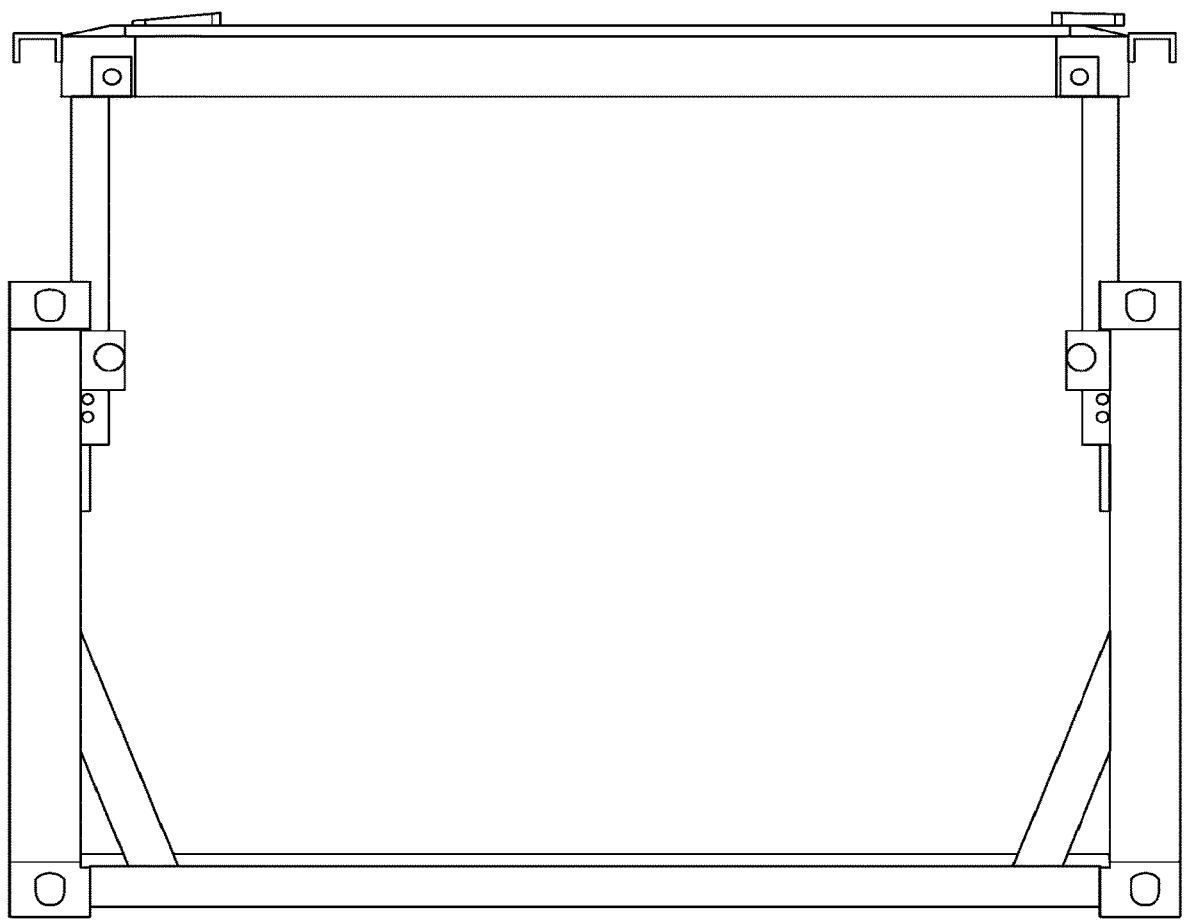

Referring now to FIGS. 4(a)-(c), which shows similar views to FIGS. 3(a)-(c), the conveyor module 1 is shown with the roof 8 raised to an expanded or operational position. FIG. 4(a) illustrates an isometric view with the roof raised in this operational position, whilst FIG. 4(b) illustrates side elevation view with the roof raised, and, FIG. 4(c) shows an end view with the roof raised. It should be noted that in FIGS. 3(a)-(c) and 4(a)-(c), the conveyor componentry is not shown for clearer understanding of the roof positions.

Figure 5A:
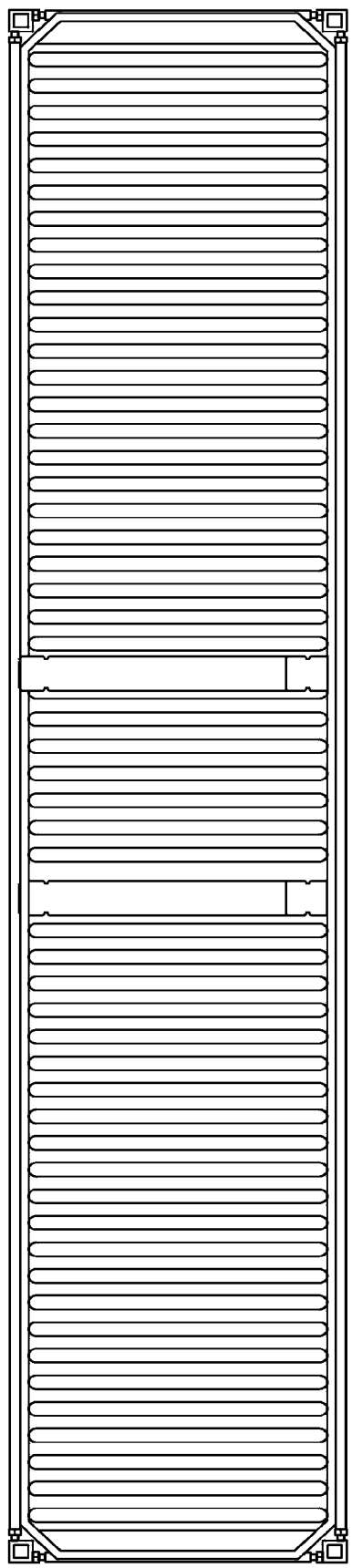
FIGS. 5(a) and 5(b) are, respectively, top and bottom views of the conveyor module in accordance with the present invention.
Figure 5B:
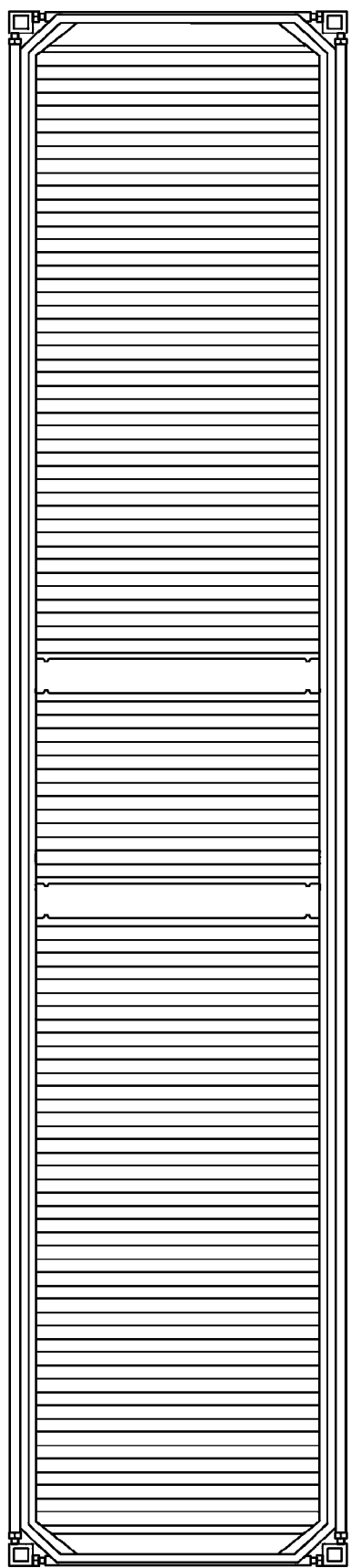

FIGS. 5(a) and 5(b) are plan and bottom views, respectively of the conveyor module 1 as shown in FIGS. 3(a)-(c) and 4(a)-(c).

Figure 6:
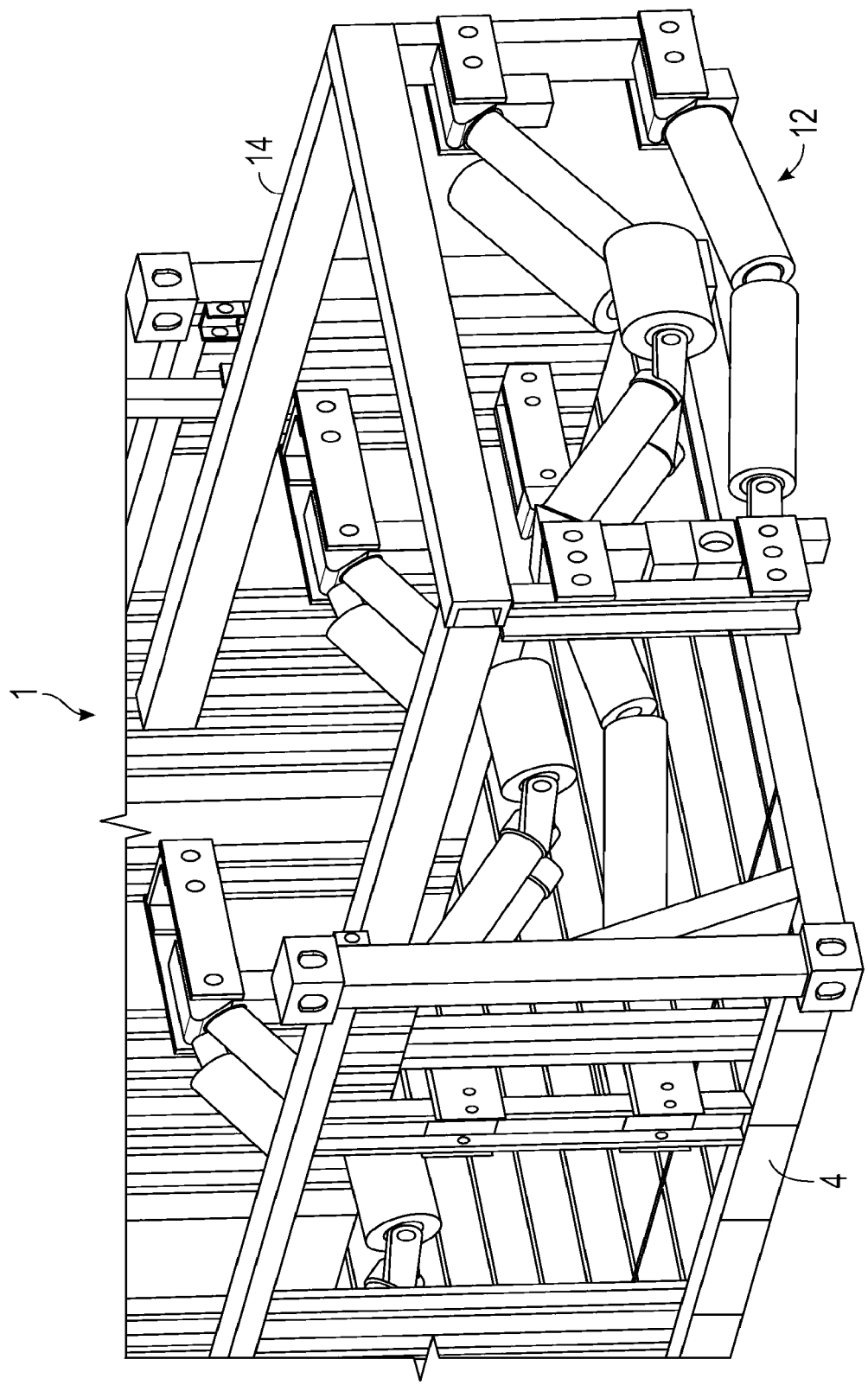
FIG. 6 illustrates an expanded view of the end portion of the conveyor module of FIG. 1, but with the extension frame extending at least partially out the end of the substantially longitudinal main frame.

Referring now to FIG. 6, the conveyor module 1 is illustrated to be typically formed of a substantial longitudinal main frame 4, and, an extension frame portion 14. As will be understood from FIG. 6, the extension of frame portion 14 may be adapted to slidably extend at least partially outwardly of the end of the main frame 4. The extension frame portion 14, which supports conveyor components 12 effectively increases the operable length of the conveyor module 1. This facilitates productive use of the available space in or from each conveyor module 1, during transportation, whilst thereafter, at the installation location, the extension frame portion 14 may be slid outwards to the operating position, such as shown in FIG. 6.

Referring back to FIG. 2, it will be noted that, when two conveyor modules 1 are positioned in spaced apart relationship, the extension frames 14 of each module 1 may be slid outwardly towards each other. The advantage of having these slidable extended frame portions 14 rather than simply providing a plurality of conveyor modules adjacent to each other is that this reduces the number of modules required to be built and transported. This is particularly advantageous in remote locations.

Figure 7A:
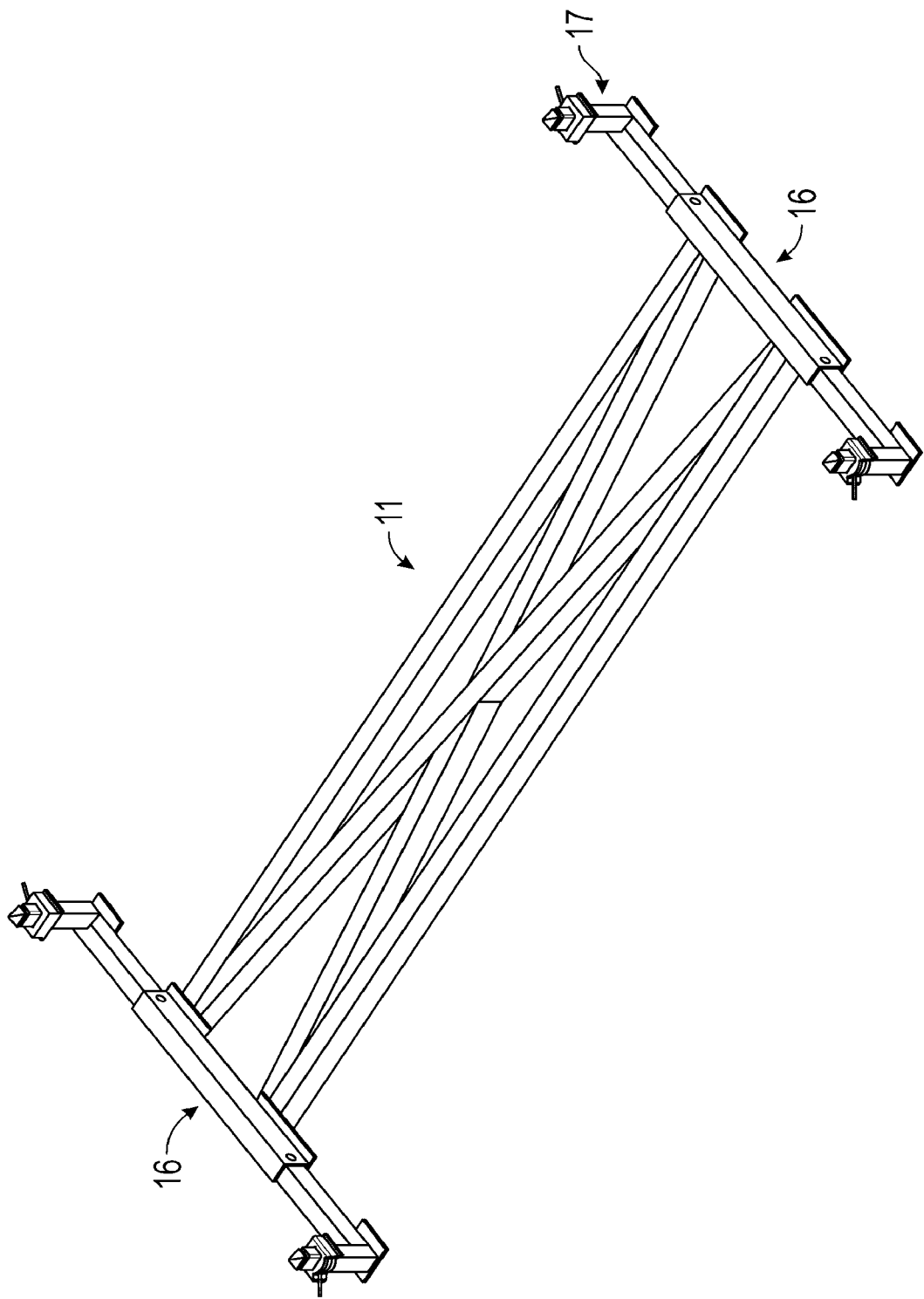
FIG. 7(a) is an isometric view of the support frame in accordance with the present invention, which may be used to interlink two spaced apart conveyor module.
Figure 7B:
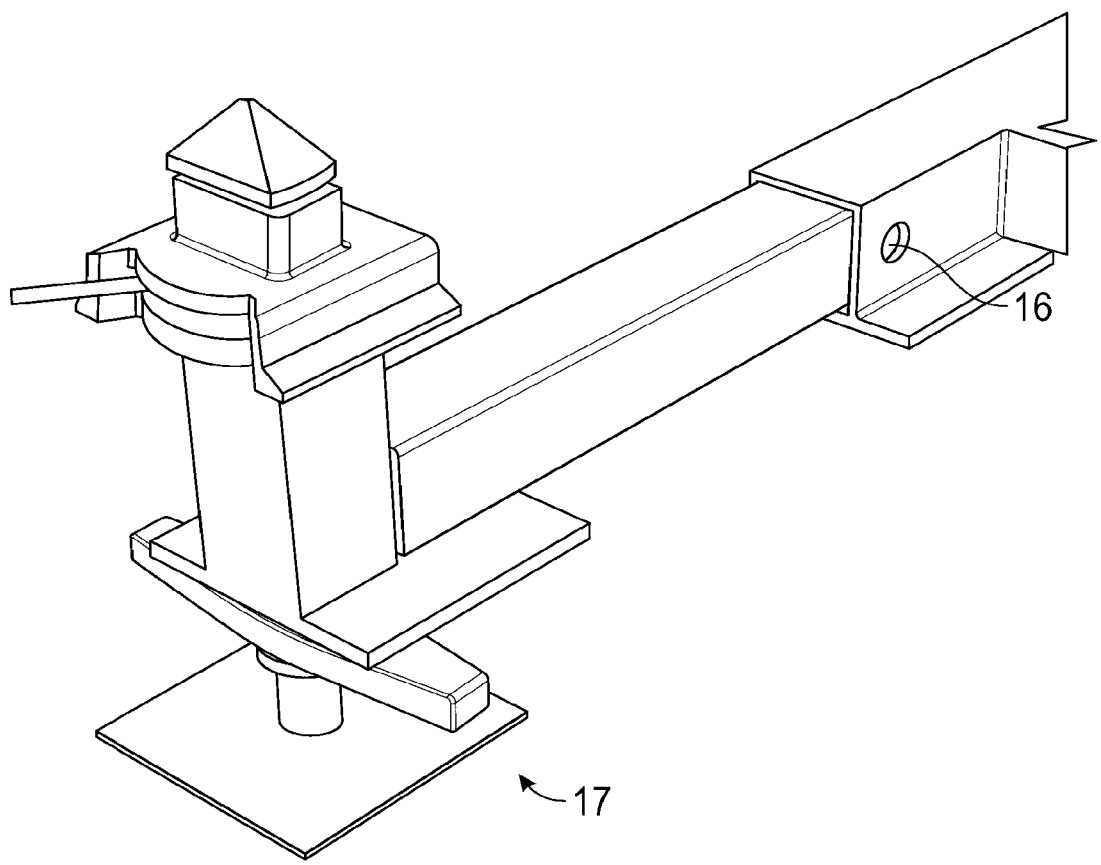
FIG. 7(b) is an expanded isometric view of the support post 17 of FIG. 7(a)
Figure 8:
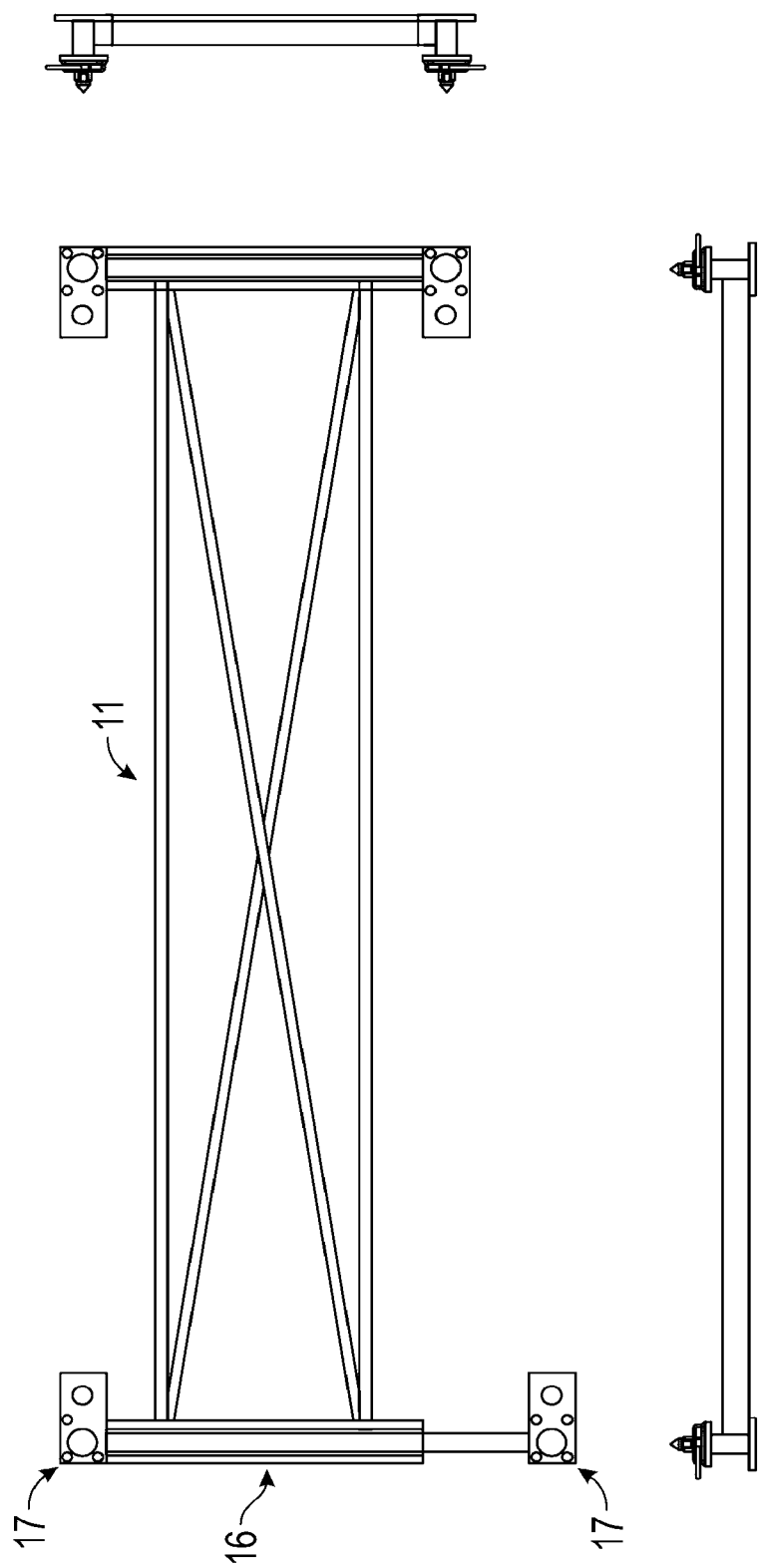
FIG. 8 illustrates some additional views of the support frame shown in FIGS. 7(a) and 7(b)

FIGS. 7(a) and 8 illustrate a preferred embodiment of a support frame 11 which may be used in conjunction with the conveyor module 1 to form the conveyor assembly 15 of the present invention. The support frame 11, as shown in FIGS. 7(a) and 8 may be typically formed of metal and may be made of any desired size. The support frame is adapted to be positioned on a substrate surface, to support modules 1. The ends 16 of the frame 11 may optimally be telescopically expandable in width, and, provided with support posts 17 for engaging with and supporting the conveyor module 1. As shown in FIG. 7(*b*), the support posts 17 are preferably height adjustable to compensate for an uneven substrate surface and/or to support the support frame 11 in a substantially horizontal manner or any other desired angular disposition.

Figure 9:
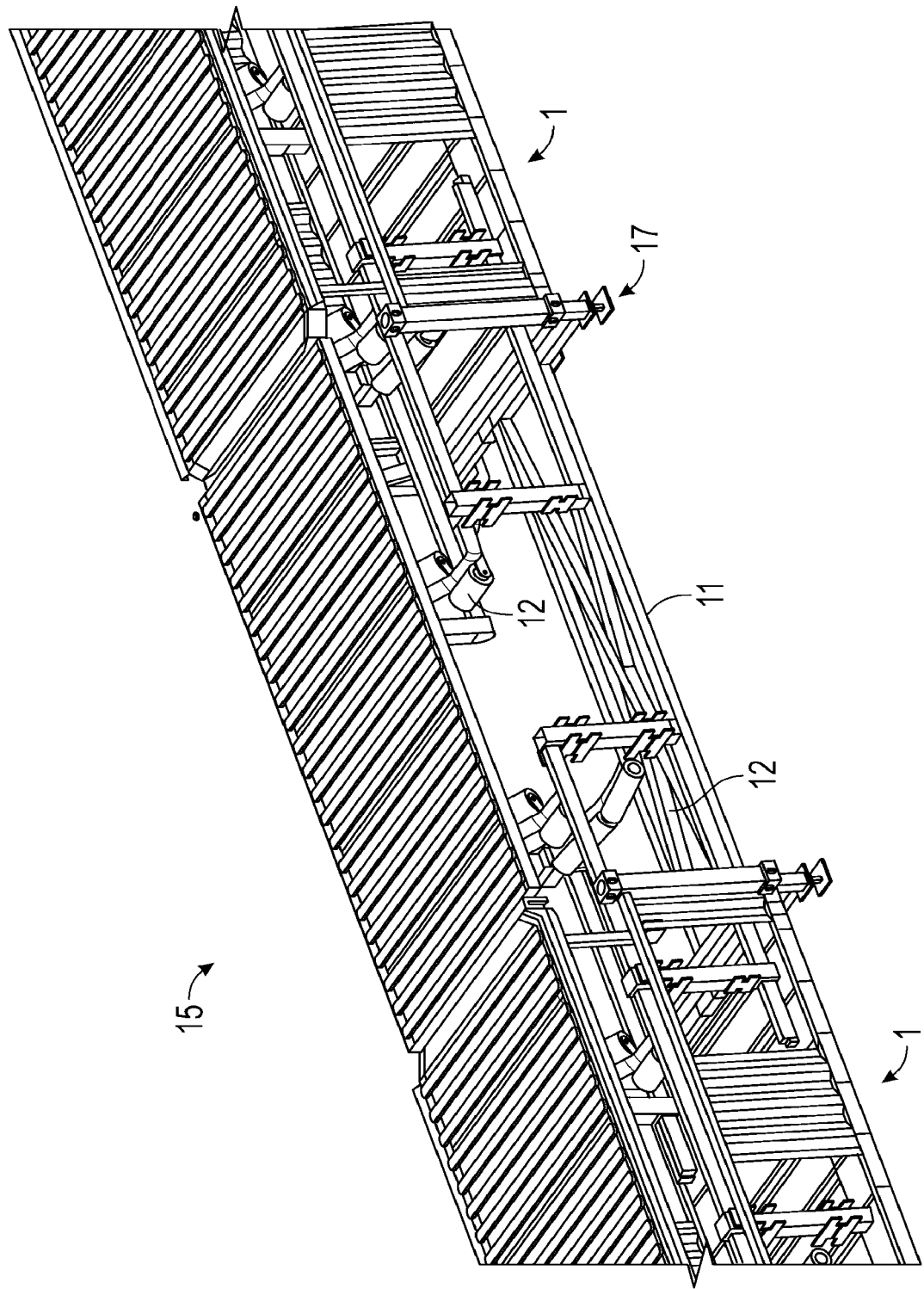
FIG. 9 illustrates an isometric view of a pair of conveyor modules supported on either end of the support frame shown in FIGS. 7(a) and 7(b)

FIG. 9 illustrates a preferred embodiment of a portion of a conveyor assembly 15, including a pair of conveyor modules 1 supported on either end of a support frame 11, and in particular, on the corners of the support frame 11 on support posts 17. As will be understood, any number of conveyor modules 1 and support frames 11 may be interconnected to form a conveyor assembly.

Figure 10:
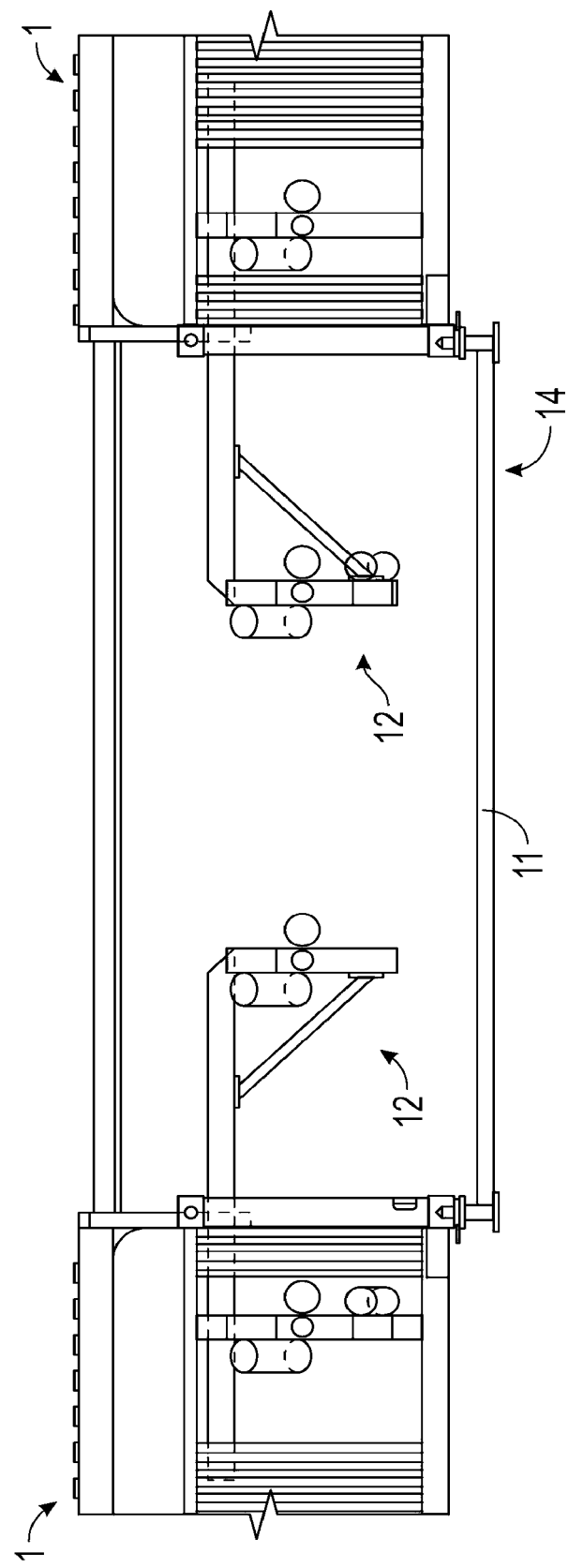
FIG. 10 illustrates an elevational view of some of the main components of some of the support frame and modules that are shown in FIG. 9, with the conveyor componentry in the operating position.

FIG. 10 illustrates a schematic elevational view showing how typical conveyor components 12 may slide out from the ends of conveyor modules 1, above the support frame 11 to the operational position.

Figure 11:
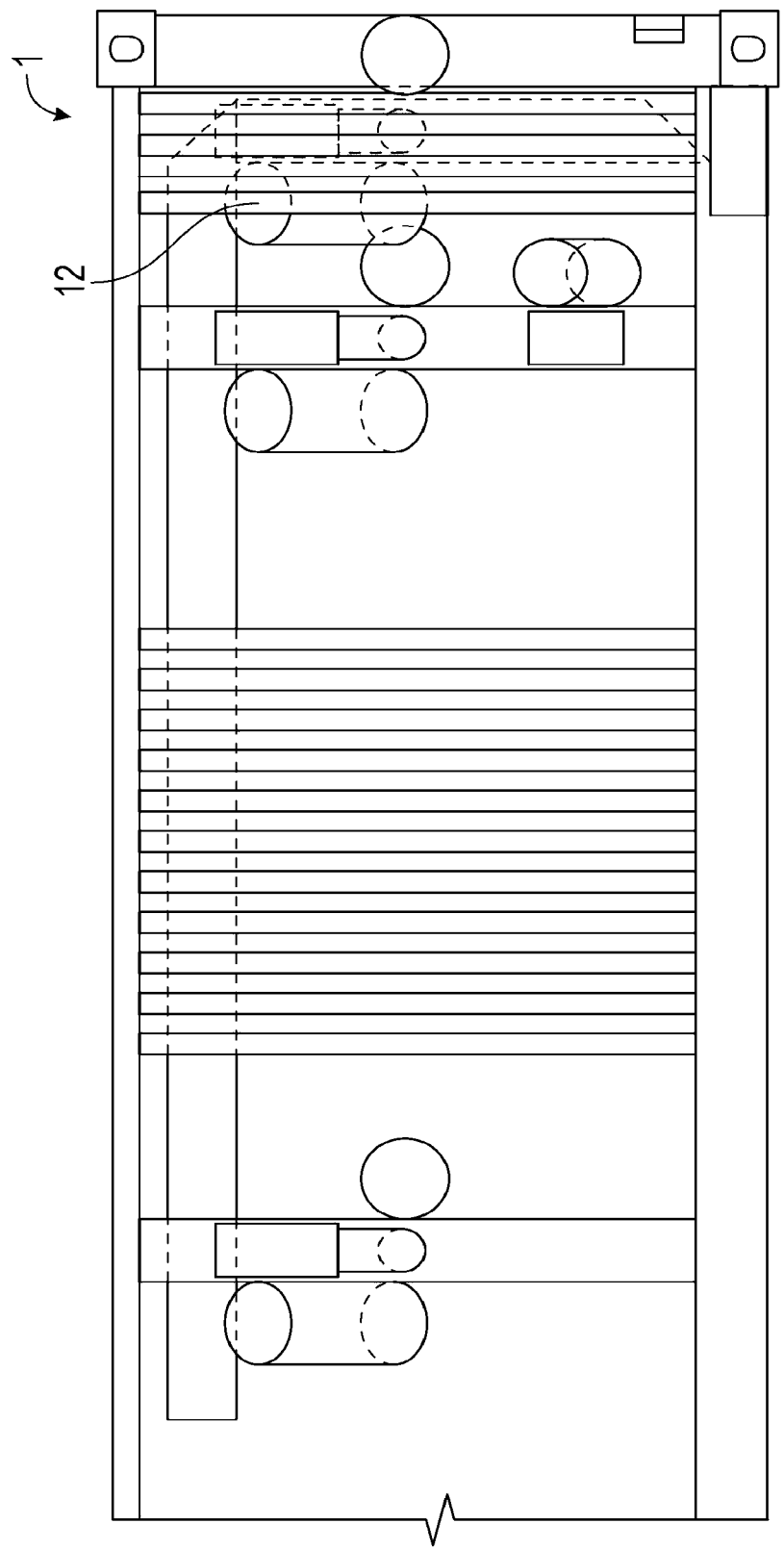
FIG. 11 illustrates how the conveyor componentry may be stowed for transport.

FIG. 11 shows the conveyor module 1, with an extendable frame portion compactly housing the conveyor components 12 within the container module 1, in the transportation position.

Figure 12:
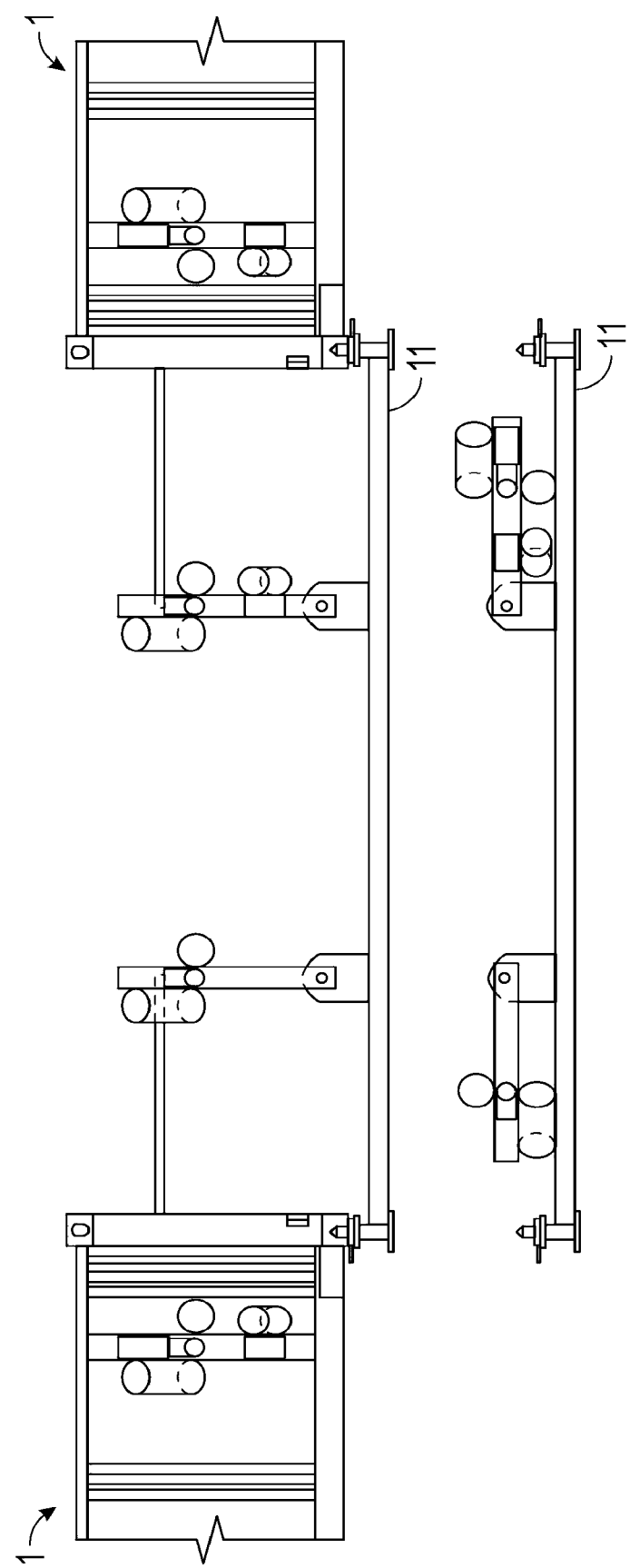
FIG. 12 illustrates transport and operational positions of support frames with optional fold down conveyor support structures thereon.

In FIG. 12 is shown how a support frame 11 may optionally incorporate various typical conveyor components thereon. FIG. 12 illustrates both the transport position, wherein the conveyor components may be pivotally hinged in a compacted configuration, and, in an operational position wherein the conveyor components are pivotally rotated from that transport position to a position for operational use. This configuration, as will be understood by a person skilled in the art, could be utilized instead of, or in addition to, incorporating the slide out conveyor component structure as previously described and shown, such as, with reference to FIG. 10.

Figure 13A:
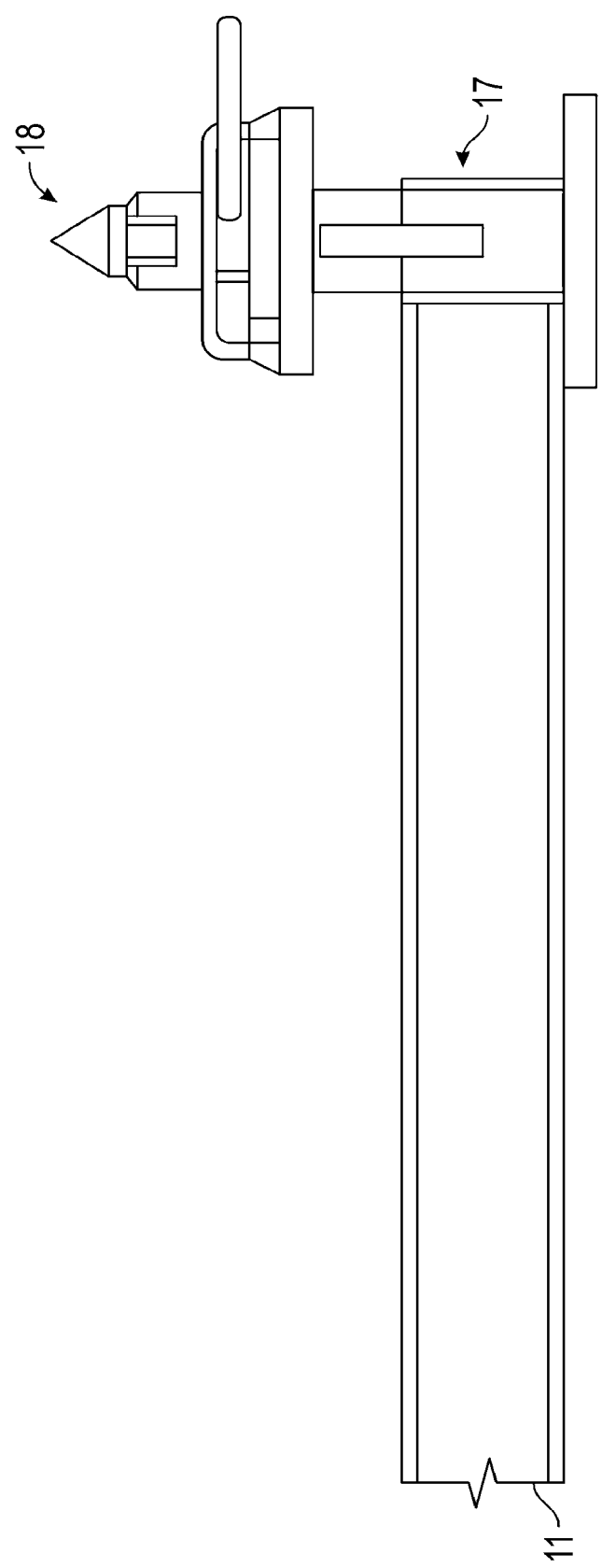
FIGS. 13(a) and 13(b) illustrate a typical means of interconnecting the support frames with a conveyor module, showing a twist lock fitting arrangement.
Figure 13B:
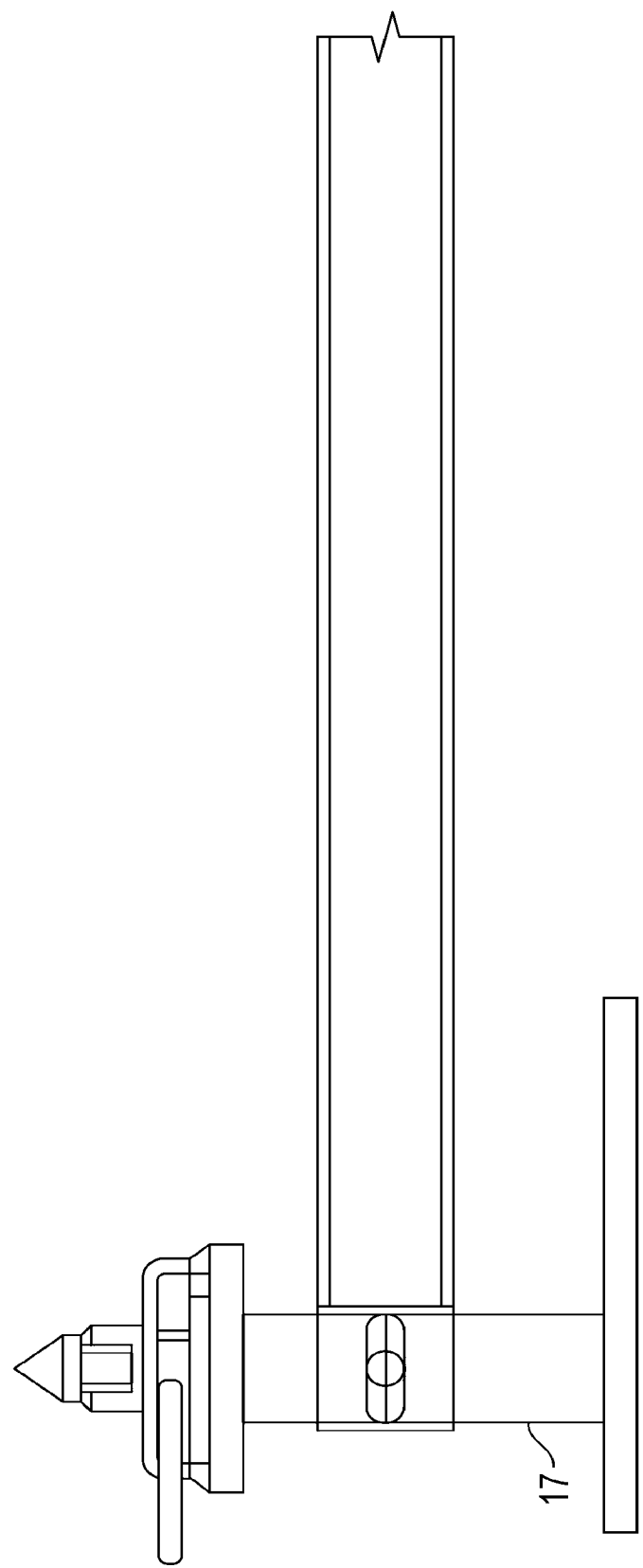

FIG. 13(*a*) illustrates how a support frame 11 may typically be releasably engaged to a conveyor module 1. FIG. 13(*a*)-(*b*) illustrate a support leg 17 of the support frame 11 incorporating a twist lock fitting 18. The twist lock fitting 18 enables quick fixing and release of the module 1 to or from the support post 17. The configuration shown, having a tapered upper end on the twist lock fitting 18, facilitates easy self-location with or in an engagement slot or orifice provided within the corner under the bottom of conveyor module 1. A variety of engagement or locking devices in alternative to the twist lock fitting 18 may alternatively be used, as would be readily apparent to persons skilled in the art.

As shown in FIG. 8, the support 11 may optionally be telescopic in form to allow for variation in frame width, so as to facilitate compact transportation but, allowing it to be expanded in width when desired to be connected to the conveyor module 1. The support frame 11 preferably allows for longitudinal movement and articulation between adjacent modules 1.

As shown in FIG. 13(*b*) the support leg 17 may also be height adjustable to assist in leveling of the container modules 1 attached thereto.

A plurality of support frames 11 may typically be positional in pairs back to back with support legs stowed therebetween during transportation. This permits efficient transportation of a plurality of the support frames/modules in a single transportation exercise, thus ensuring cost efficiency.

Alternatively, instead of using the support frames, drop down legs, such as shown in FIG. 28 (and which will be described hereinafter) may be used to support the conveyor modules 1 on the substrate surface.

Figure 14A:
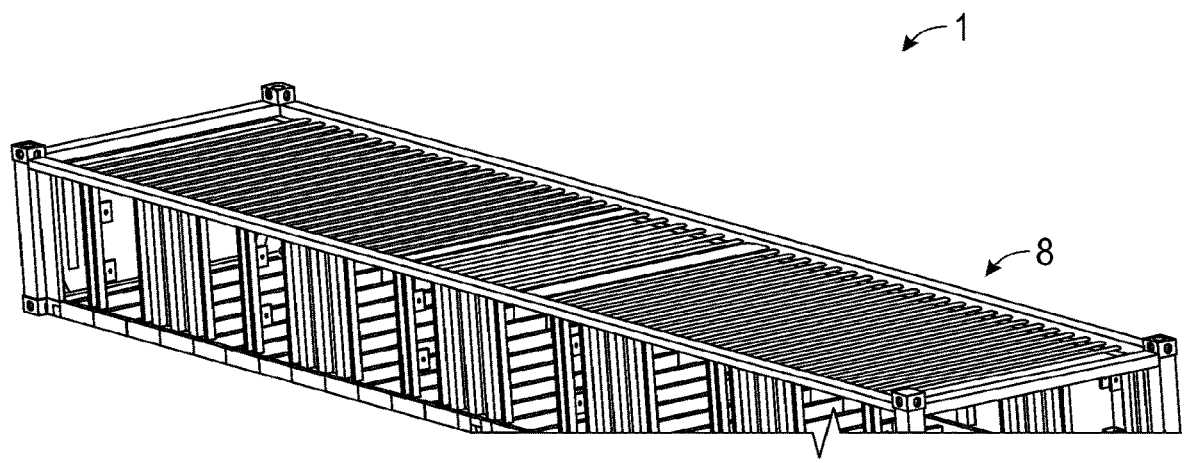
FIGS. 14(a) and 14(b) show a removable roof configuration for the conveyor module in accordance with the present invention.
Figure 14B:
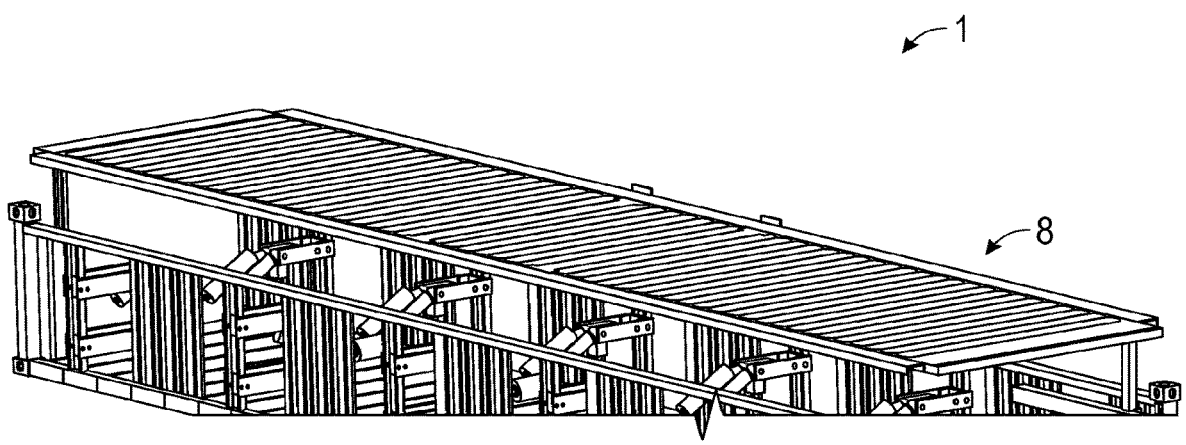

A variety of roof structures may alternatively be used on the modules 1. FIGS. 14(*a*)-(*b*) illustrate a configuration of a roof 8 which is adjustable in height and/or is removable. FIG. 14(*a*) illustrates the adjustable roof 8 in the transportation position, whilst FIG. 14(*b*) illustrates the roof 8 in the operational position.

Figure 15:
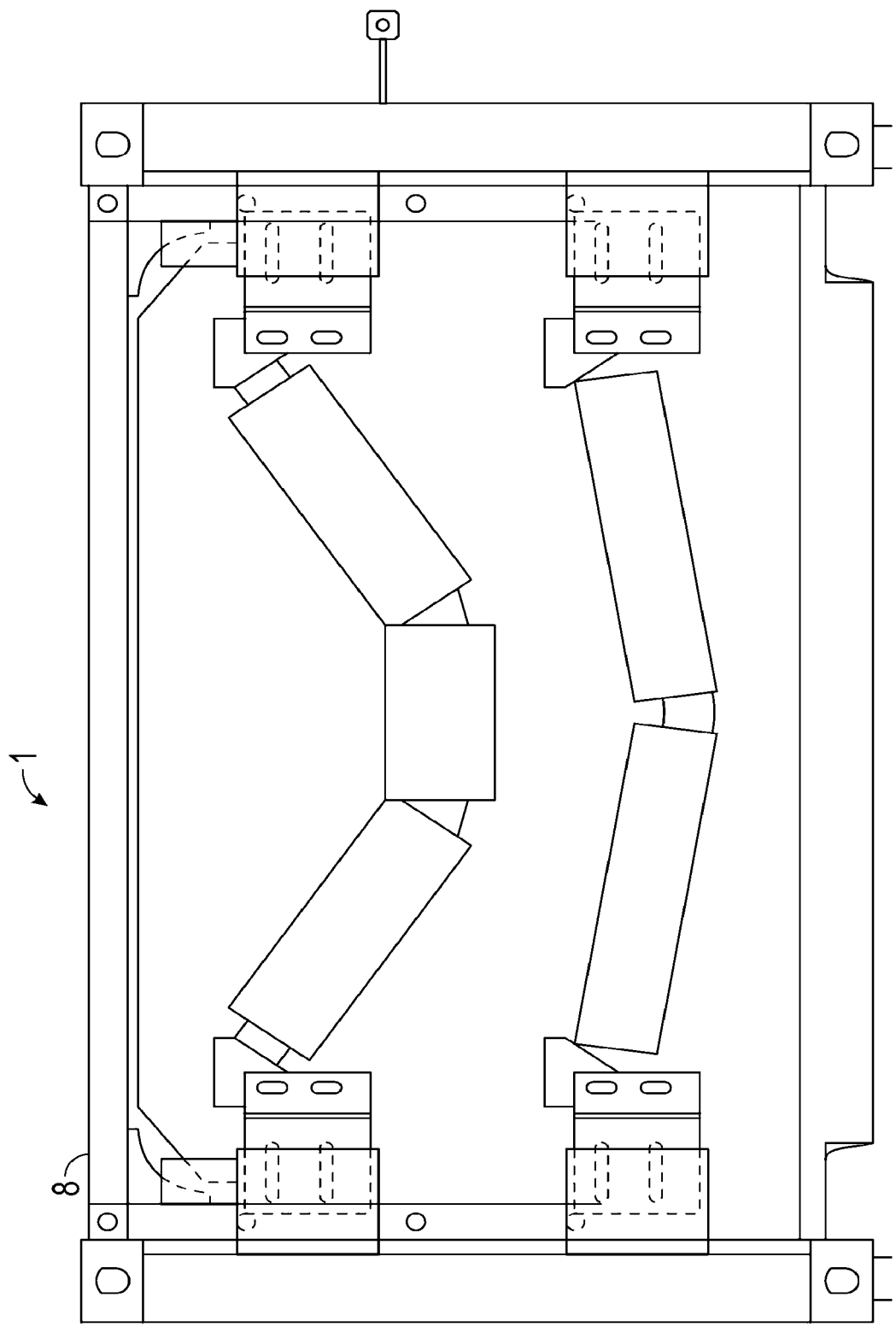
FIG. 15 illustrates an end view of the arrangement shown in FIGS. 14(a) and 14(b), showing a double pin connection for securing the roof, this figure also illustrating a slide out roof.

FIG. 15 illustrates how the roof 8 may be engaged and secured with the remainder of the main frame 4, the illustrated embodiment showing the use of a double pin locking arrangement, for improved rigidity.

Figure 16:
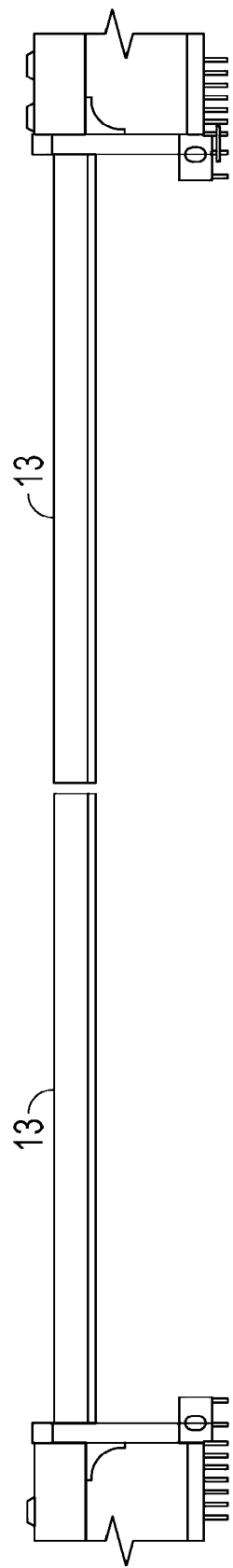
FIG. 16 illustrates a split roof arrangement for the conveyor modules in accordance with the present invention.

In FIG. 16 is shown a split roof arrangement, whereby a slide out roof 13 may be slid out from each conveyor module 1. The slide out roof portions 13 from two adjacent modules 1 may substantially abut as shown in FIG. 16.

Figure 17A:
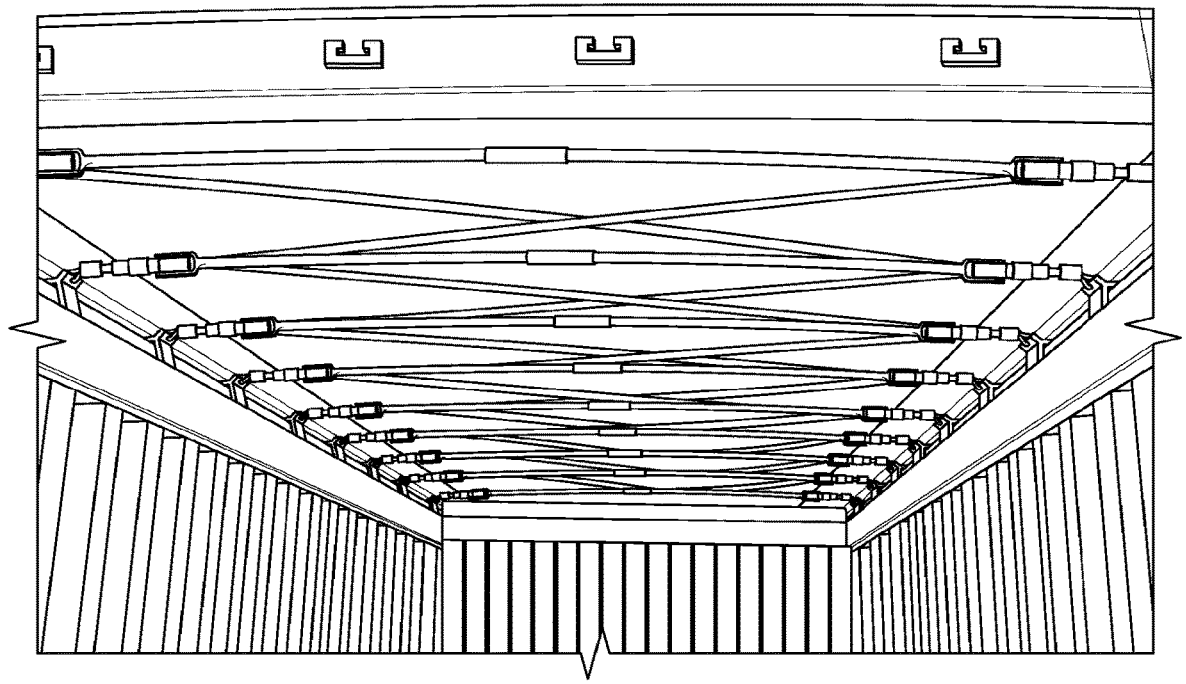
FIGS. 17(a) and 17(b) illustrates a tarpaulin roof option for the conveyor module of the present invention.
Figure 17B:
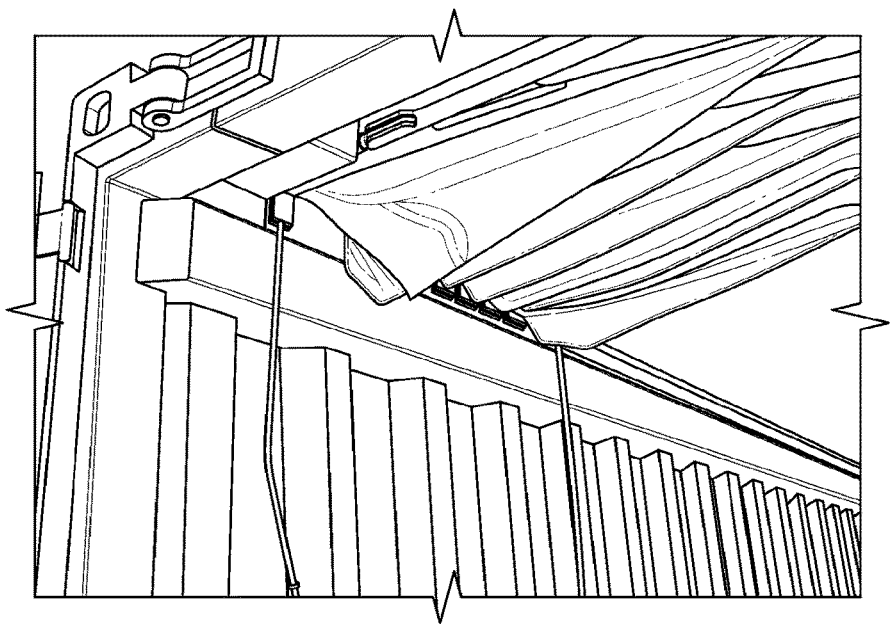

Alternatively, a tarpaulin roof may be provided, such as shown in FIGS. 17(*a*)-(*b*). FIG. 17(*a*) illustrates a tarpaulin roof in a closed position, whilst FIG. 17(*b*) shows the tarpaulin roof in the open position. Such a roof may be provided in locations of less harsh environments, where a more solid structure may not be required. The tarpaulin roof embodiment advantageously provides some form of protection from dust etc. ingress to the conveyor whilst enabling easy access during maintenance.

Figure 18:
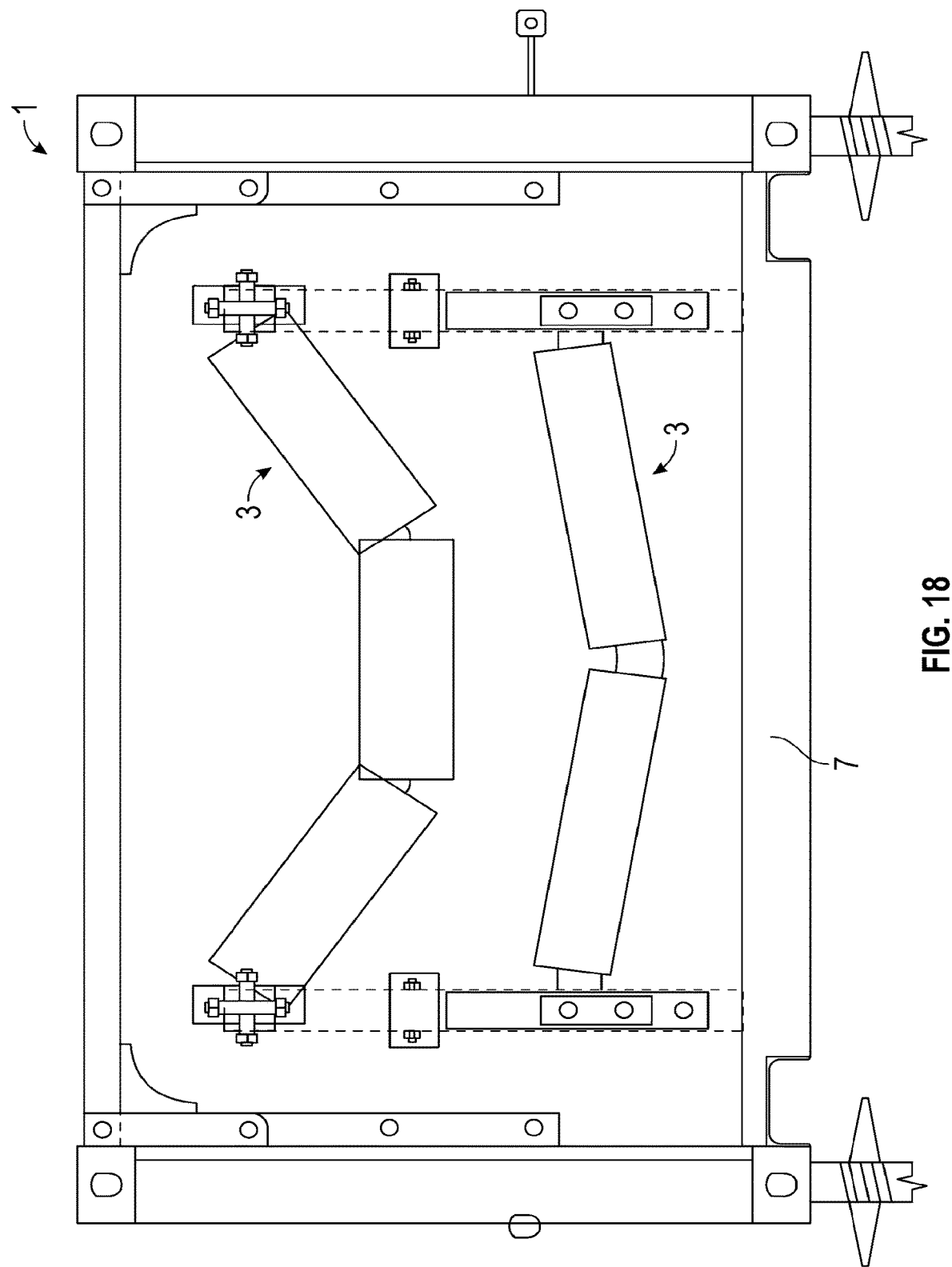
FIG. 18 illustrates a floor mounted "H" frame support structure for the conveyor components in accordance with the present invention.

In FIG. 18 is illustrated how typical conveyor components such as a conveyor idler 3 may be supported on the floor 7 of module 1 utilizing an "H" frame support structure. Various means for adjusting the position of the conveyor components will be described hereafter.

Figure 19A:
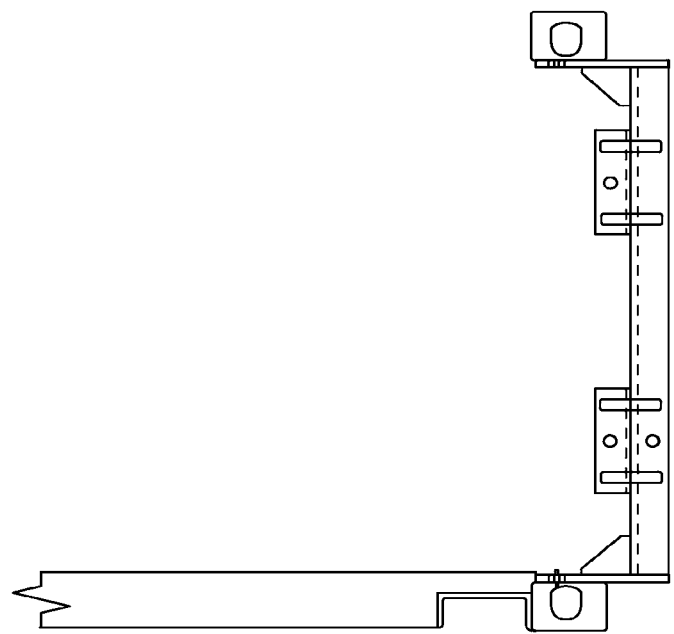
FIGS. 19(a), 19(b) and 19(c) illustrate different positions of support posts in the conveyor module to suit different belt widths, FIG. 19(a) showing these support post position for a wide belt width, FIG. 19(b) showing the support post position for a mid belt width and FIG. 19(c) showing a support post position for as narrow belt width.
Figure 19B:
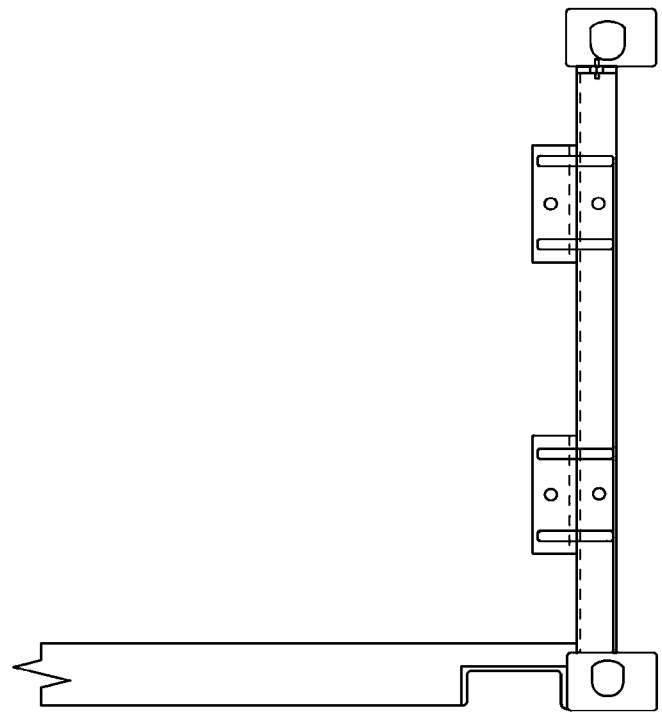
Figure 19C:
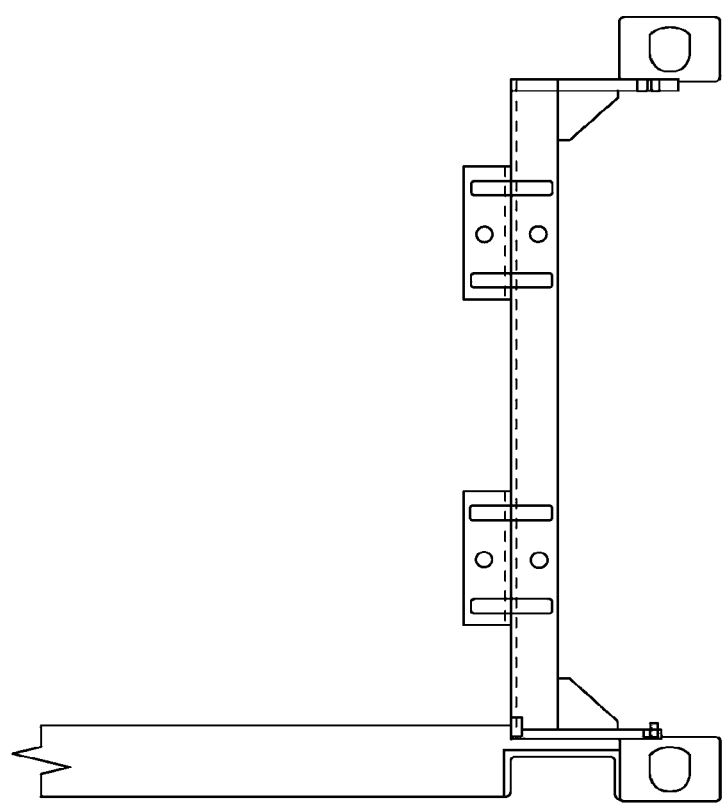

FIGS. 19(*a*)-(*c*) illustrate how idler support posts may be positioned at different locations to suit different belt widths. FIG. 19(*a*) illustrates the support post to suit a wide belt width, whilst FIG. 19(*b*) illustrates a support post position to suit a mid belt width, and, FIG. 19(*c*) illustrates a support post position to suit a narrow belt width.

Figure 20:
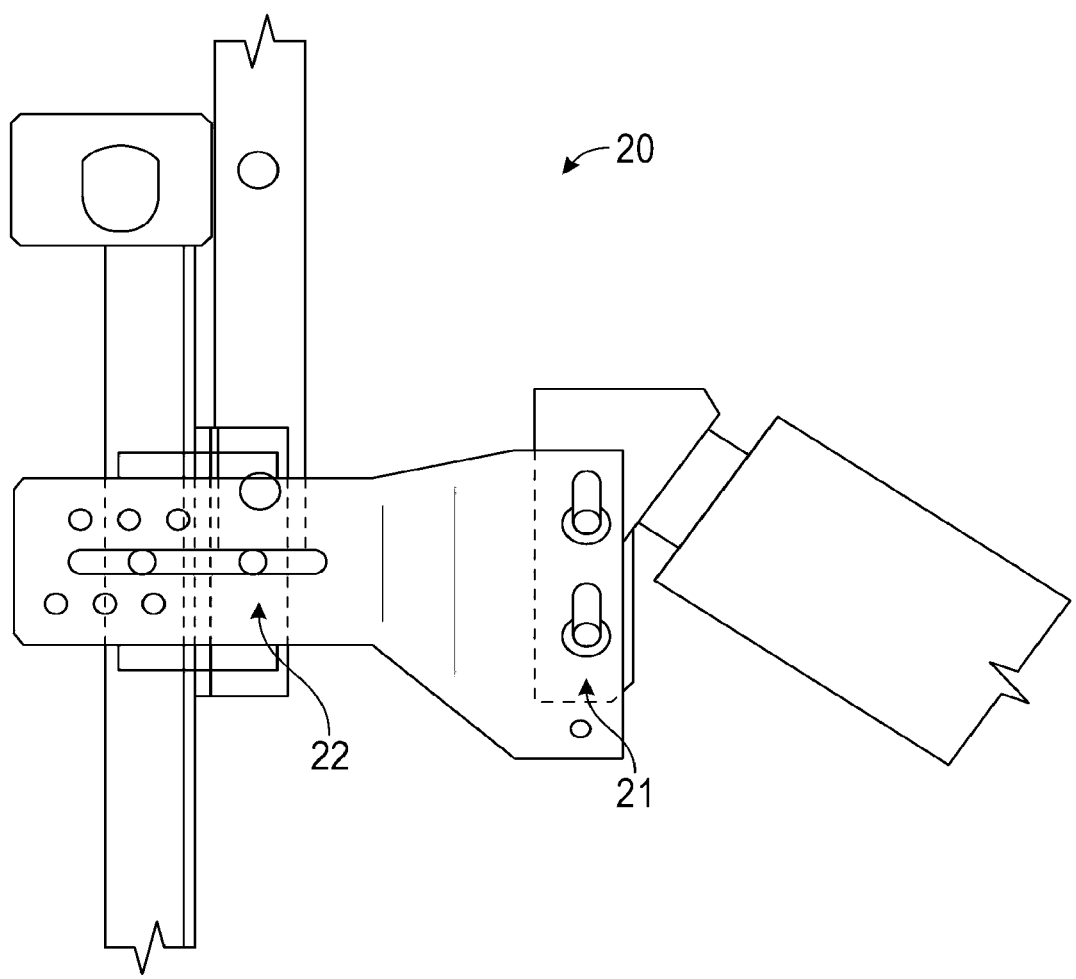
FIG. 20 illustrates an adjustable support mounting to facilitate horizontal and vertical adjustment of the conveyor components relative to the support post.

To facilitate adjustment the conveyor components 3, various mountings may be utilized. FIG. 20 illustrates a mounting 20 which incorporates one or more horizontal slots 22 and one or more vertical slots 21, to allow for both horizontal and vertical adjustment of the conveyor idler 3 or other conveyor components.

Conveyor support brackets can also be supplied in an offset version that adjusts either side if the structure inbye or outbye to compensate for an out of tolerance condition that affects belt tracking.

Figure 21:
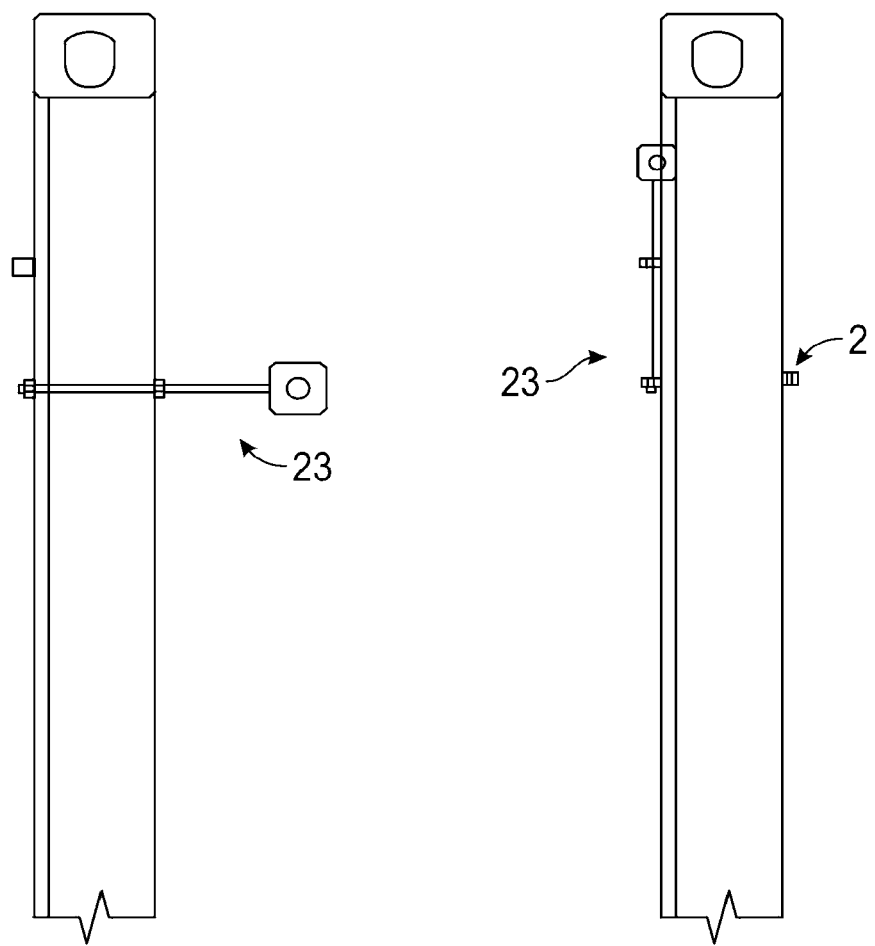
FIG. 21 illustrates operational and transport position of a retractable lanyard wire support system which may be incorporated in the conveyor module of the present invention.

As will be understood by persons skilled in the art, various other optional features may additionally be provided with conveyor module of the present invention. For example, wire supports may be required. A retractable lanyard wire support 23 is shown in FIGS. 21(*a*)-(*b*), illustrating both the operating and transport positions of such a component.

Figure 22:
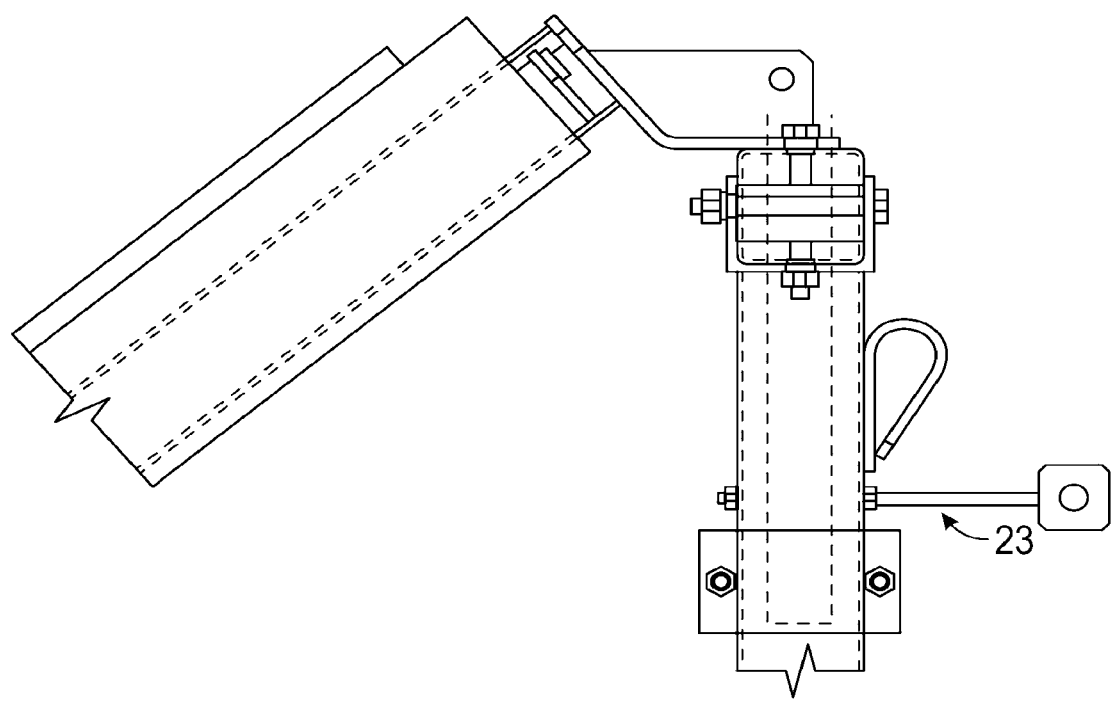
FIG. 22 illustrates a structure mounted lanyard wire support which may be incorporated in the conveyor module of the present invention.

FIG. 22 illustrates a structured mounted lanyard wire support which may also optionally be incorporated in the module of the present invention.

Figure 23A:
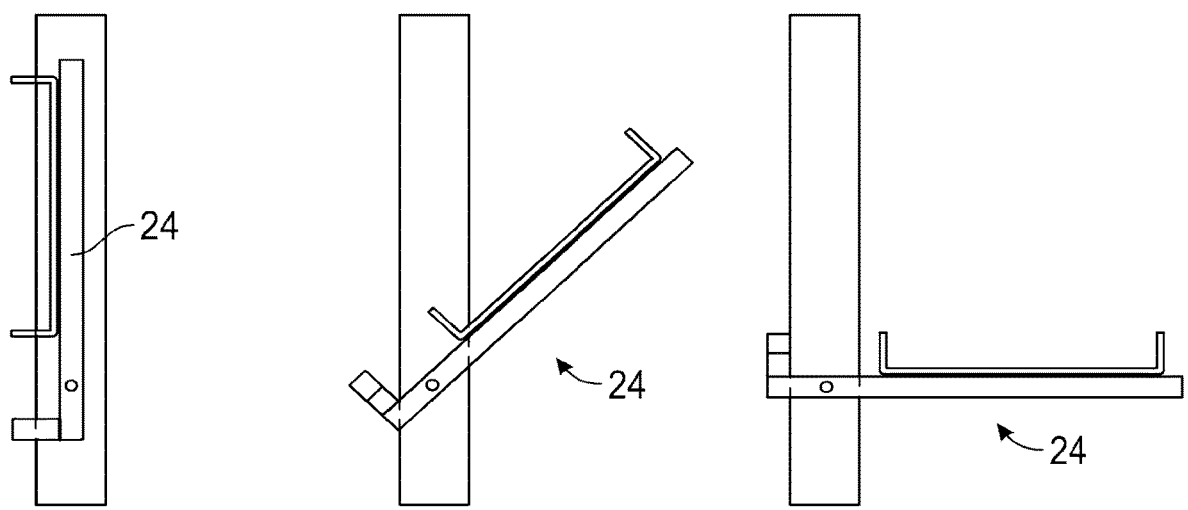
FIG. 23(a) illustrates transport, in transit, and operational positions of a drop down cable tray which may be incorporated in the conveyor module of the present invention.
Figure 23B:
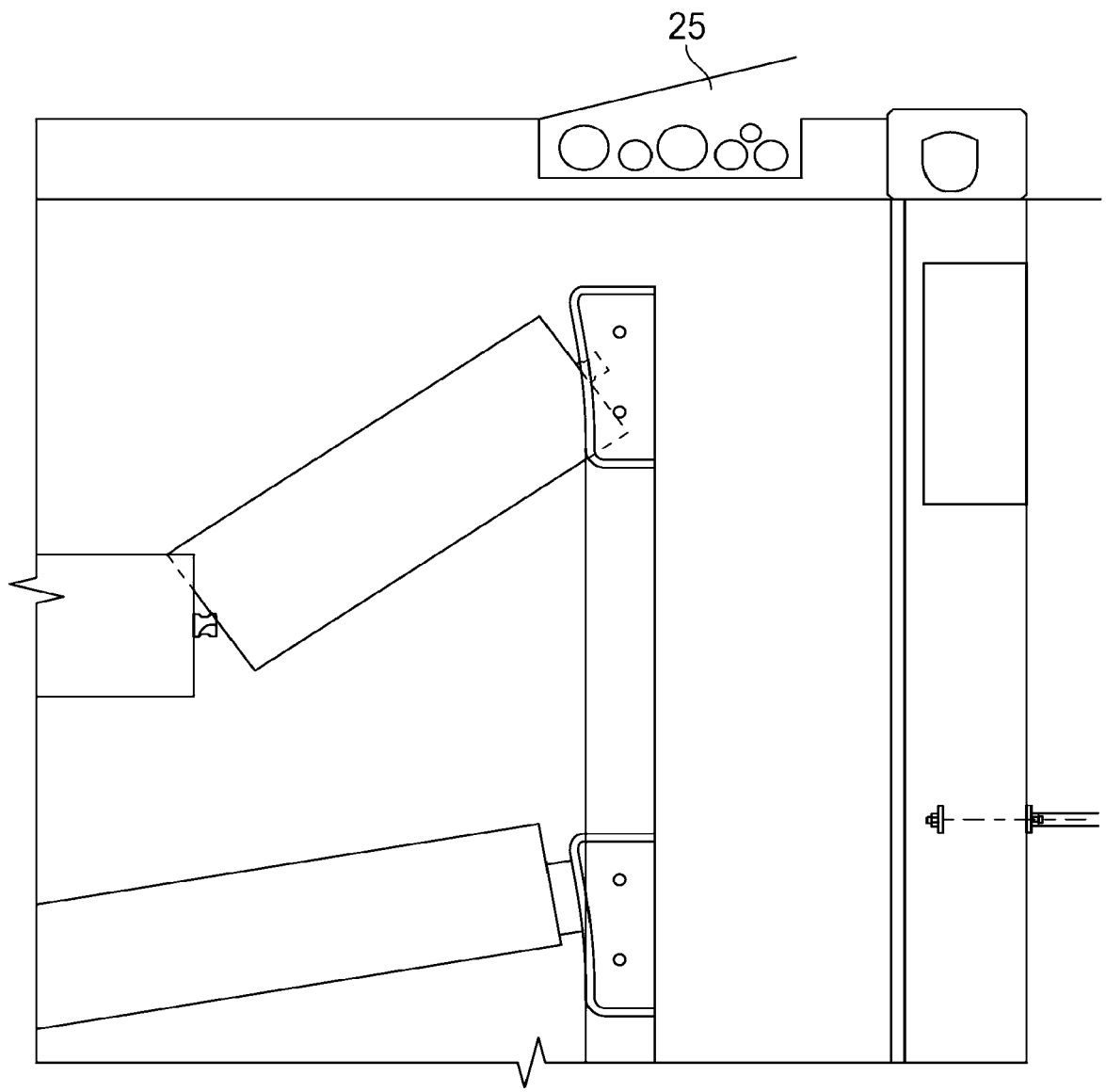
FIG. 23(b) illustrates a roof mounted cable tray option.

FIG. 23(*a*) illustrates yet another optimal conveyor component, being a drop down cable tray 24, and shows both the transport in transit and operational positions of the cable tray, and, FIG. 23(*b*) illustrates roof mounted cable tray option.

Figure 24:
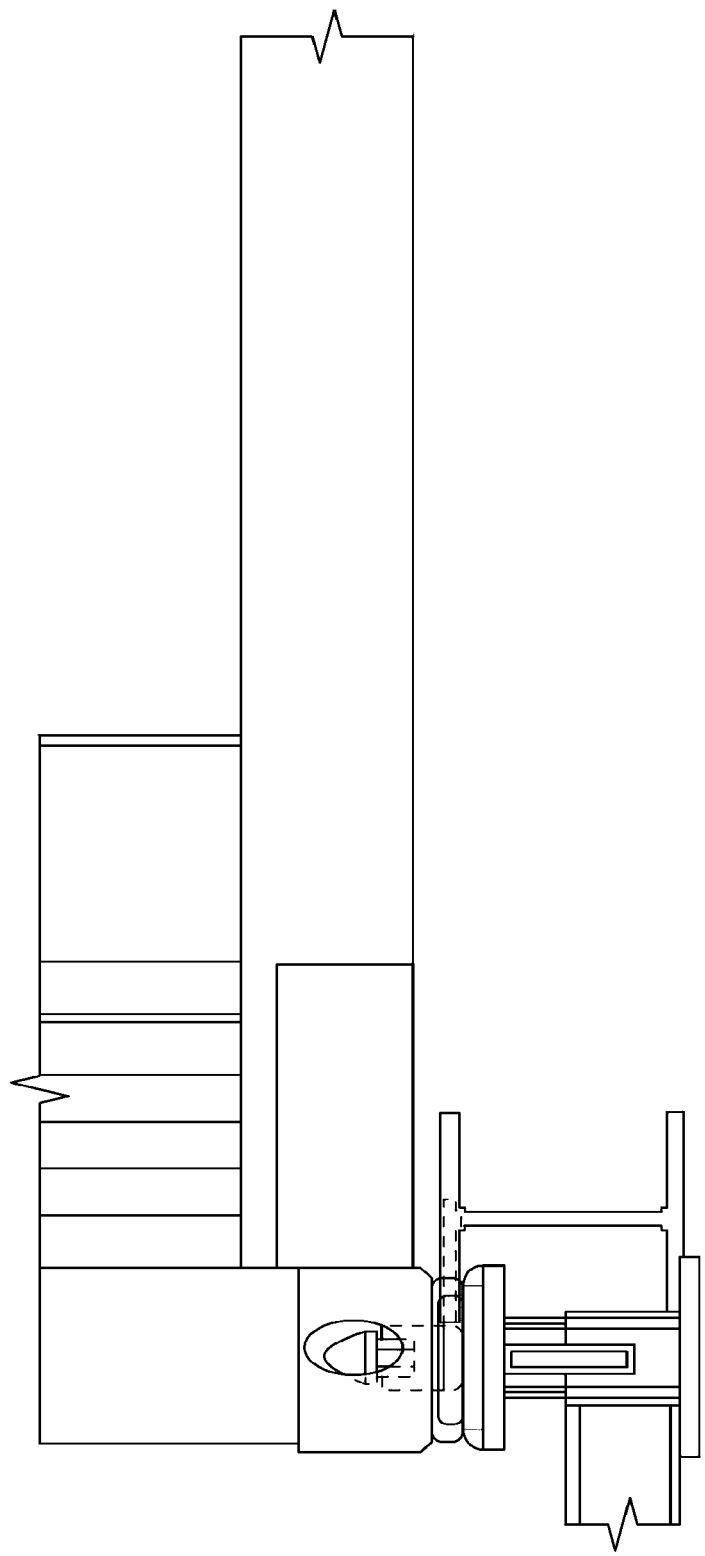
FIG. 24 illustrates a walkway support beam arrangement which may be incorporated in the conveyor module of the present invention.

FIG. 24 shows a walkway support beam may additionally be incorporated to provide walkway and maintenance access on any elevated section of the conveyor. The platform support beam may be supplied as a mounting point for walkway sections when required.

As will be apparent to persons skilled in the art, conveyor modules 1 may be manufactured to house any number of optional conveyor components therein and then transported, in a compact manner to the location where the conveyor modules are to be installed to form a conveyor assembly 15. To install the conveyor assembly 15 at the installation location, support frames 11 may be firstly placed on the substrate surface. Once support frames 11 are in position, then a conveyor module 1 may be positioned atop the ends of the support frames 11 and span adjacently positioned support frames 11. A twist lock arrangement 18 described in relation to FIGS. 13(a)-(b) may be utilized, so that the module 1 may be effectively locked to the respective support frame support posts 17. Thereafter, the extension frames 14 may be slid outwardly of the main frame 4, and any conveyor componentry may then be spaced apart at appropriate positions along the conveyor assembly 15. For example, conveyor idlers 3 which may initially be transported within the main frame 4 may be slid out on the extension frames 14 to their desired operational position such that they are then relatively evenly spaced apart, if so desired, to thereby then support a conveyor belt.

The roof 8 of the modules 1 may be elevated from the transportation position to the conveyor operational position. If the conveyor assembly is at some stage later thereafter decommissioned, extension frames 14 may be slid back within the main frames 4 to be compactly housed and thereby transported for relocation to another location.

Particular embodiments of the module 1, support frame 11, etc have been herein described, as have certain optional features thereof, all directed towards a conveyor module which may be pre-fabricated with all its main components, then transported for installation, along with other such modules 1. The modules 1 are typically dimensioned to be compatible with the standardized ISO intermodal shipping container dimensions. The modules may then be quickly and easily transported with existing modes of transportation set up for transporting shipping containers, and then rapidly commissioned at a location, which may typically be remote.

Figure 25:
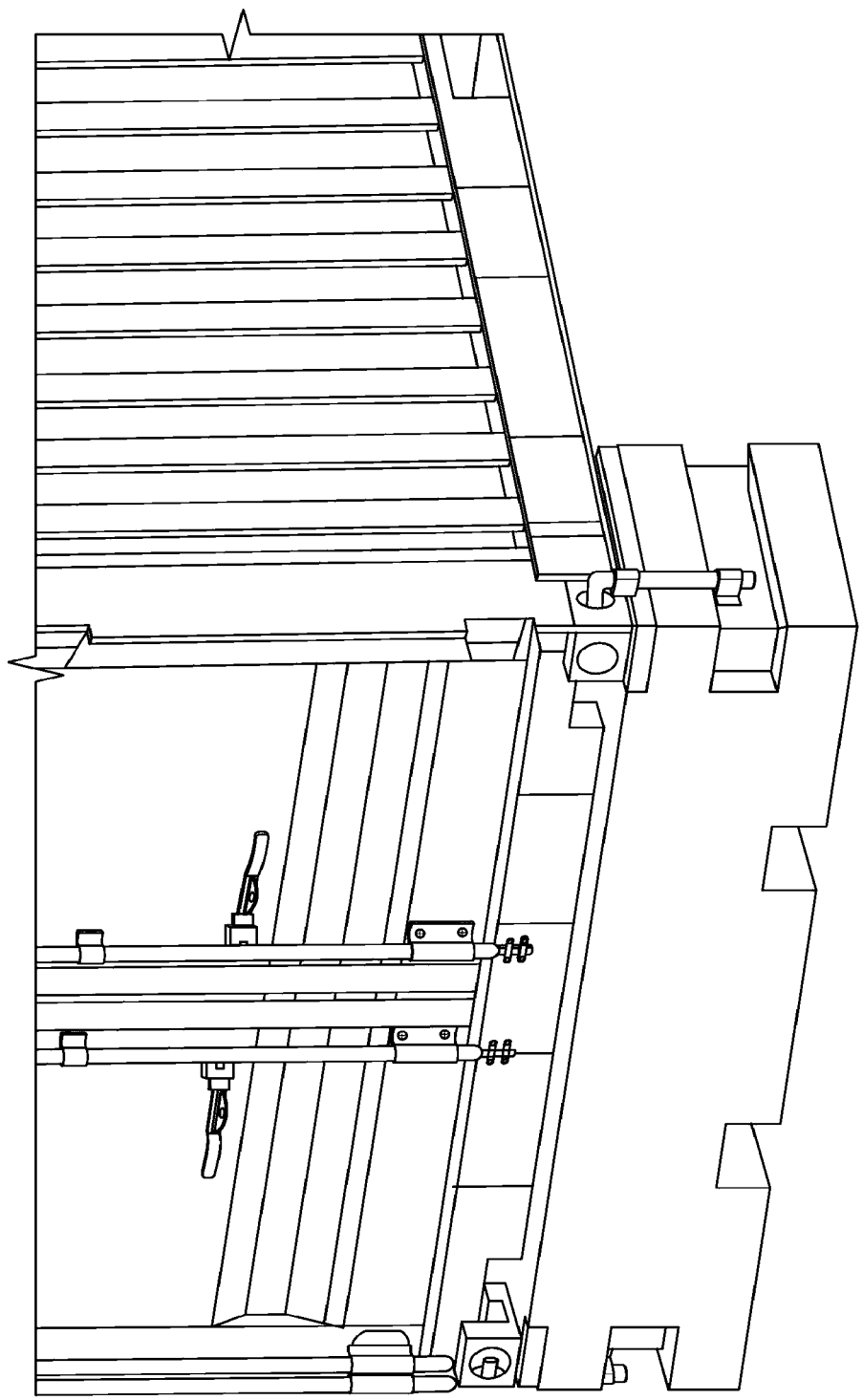
FIG. 25 illustrates an alternative to the support frame.

As shown in FIG. 25, an end of a conveyor module 1 may alternatively be embodied to be supported on a support pad, for example, a support pad formed of concrete or like material. The module may be, in this embodiment, affixed to the support pad in a removable manner by utilizing a bridge clamp connection as shown in FIG. 25. Alternatively, a pre-cast threaded bore casing that allows threaded adjustable legs with twist lock fittings may be used. Other forms of support may alternatively be used as will be appreciated by persons skilled in the art.

Figure 26:
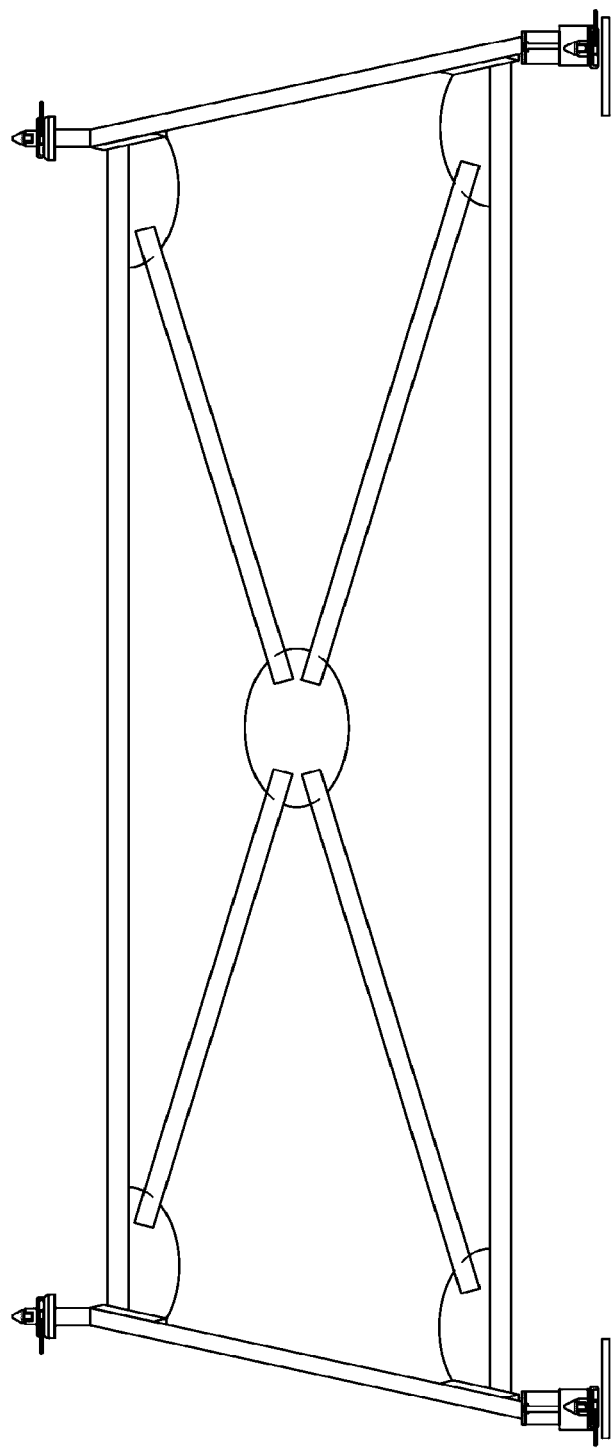
FIG. 26 illustrates yet an alternative support frame to that shown in FIGS. 7(a) and 7(b), but which may also be used to interlink two spaced apart conveyor modules.

In FIG. 26 is shown an alternative support frame 11 to that previously described in relation to FIGS. 7(a)-(b). This version of the support frame 11 incorporates a trestle arrangement which provides the ability to flat pack the frame sides for transport. The sides may then be bolted together on site to form a trestle. The four corners of the base may utilize corner castings which could provide a simple lock in to the bed of a truck, similar to that as is done with shipping containers. Frames could typically be supplied in adjustable height to cater for varying slope.

Figure 27A:
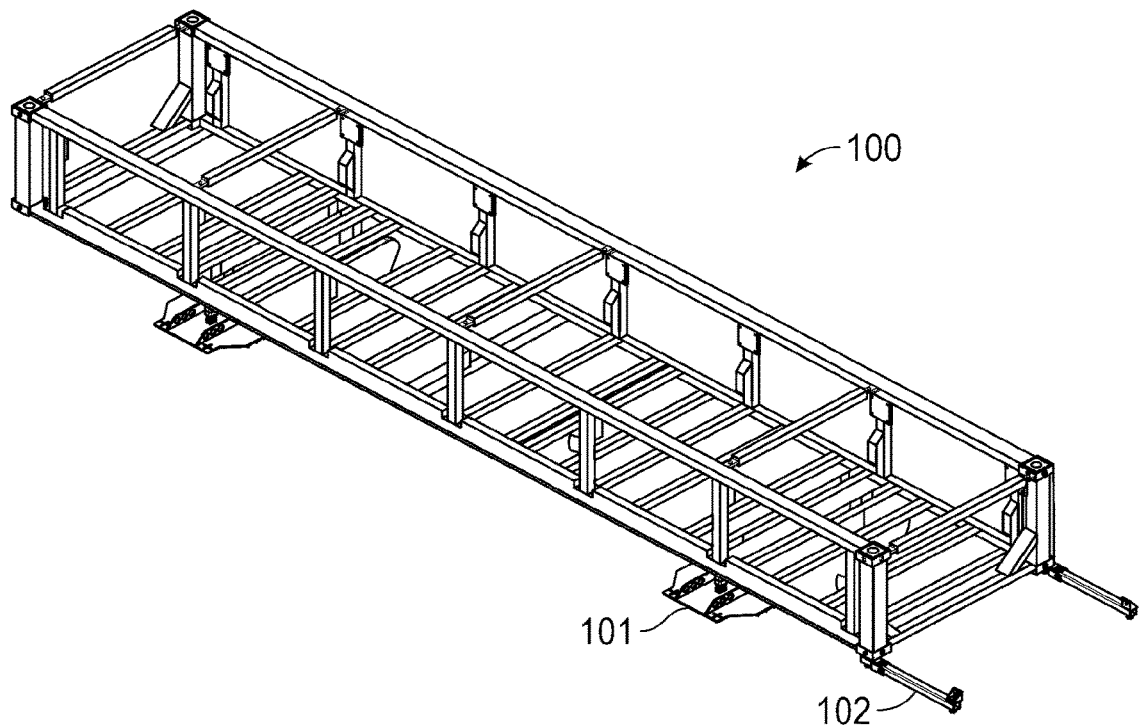
FIGS. 27(a) and 27(b) illustrate framework of a modular conveyor structure, dimensioned to be compatible with an intermodal shipping container, FIG. 27(a) showing the module without the conveyor componentry included therein and, FIG. 27(b) showing the module with conveyor idlers therein.
Figure 27B:
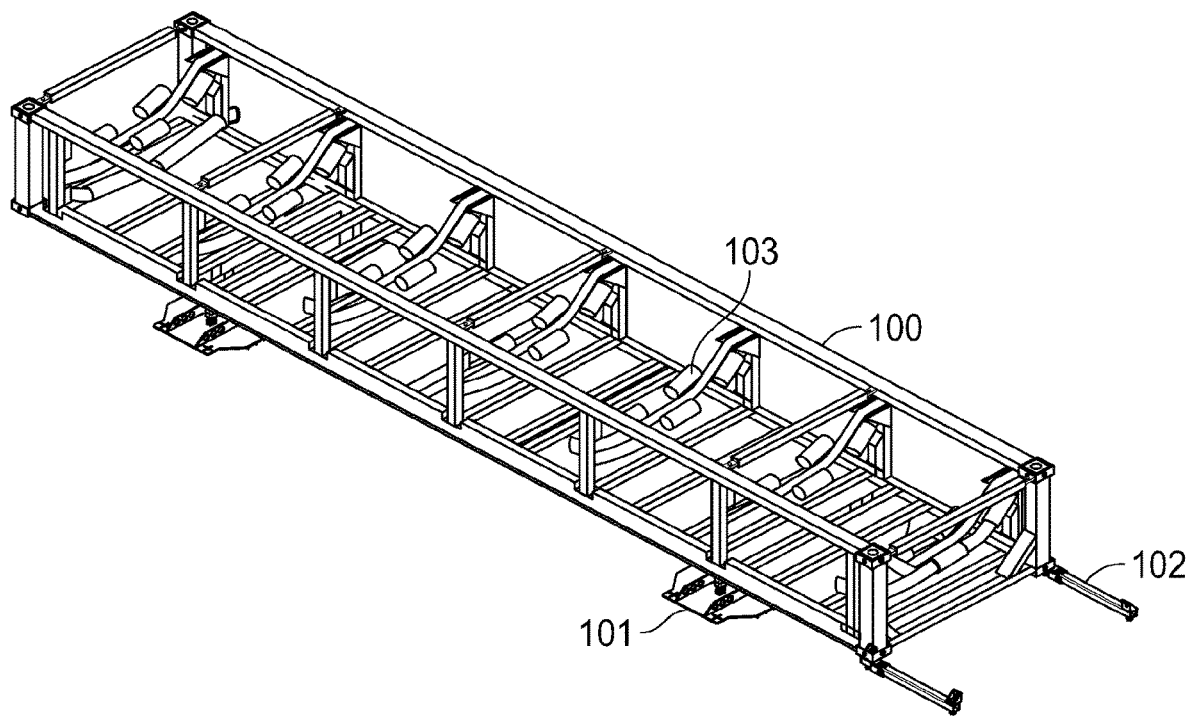

FIGS. 27(a)-(b) show yet an alternative embodiment of the invention. As previously described, the conveyor module 1 of the present invention is preferably formed to be of a standardized size and shape such that it substantially conforms with an intermodal shipping container. The framework of another embodiment of a container module 100 is illustrated in FIGS. 27(a)-(b), without the conveyor componentry shown therein, but, with "drop down" support legs 101 shown thereon. The container framework, generally designated by the numeral 100, shows four support legs provided thereunder 101, and also, shows module connection arms 102 on one end of the framework, the details of which will be described hereinafter. FIG. 27(b) also illustrates the frame 100, the legs 101 and the arms 102, but also illustrates idlers 103 positioned within the conveyor module frame 100, at spaced apart locations therein.

Figure 28A:
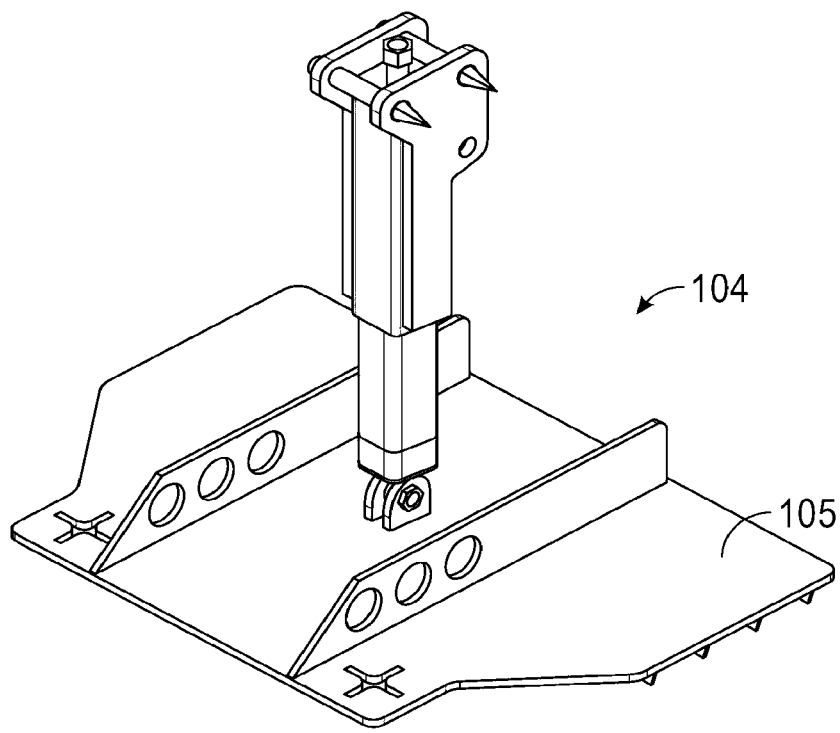
FIGS. 28(a), 28(b) and 28(c) illustrate support legs which may support the module, FIG. 28(a) showing an isometric view thereof, FIG. 28(b) showing a cross-sectional view of the support leg in the operational position, and FIG. 28(c) showing a cross-sectional elevational view of the leg in the folded, retracted or transport position.
Figure 28B:
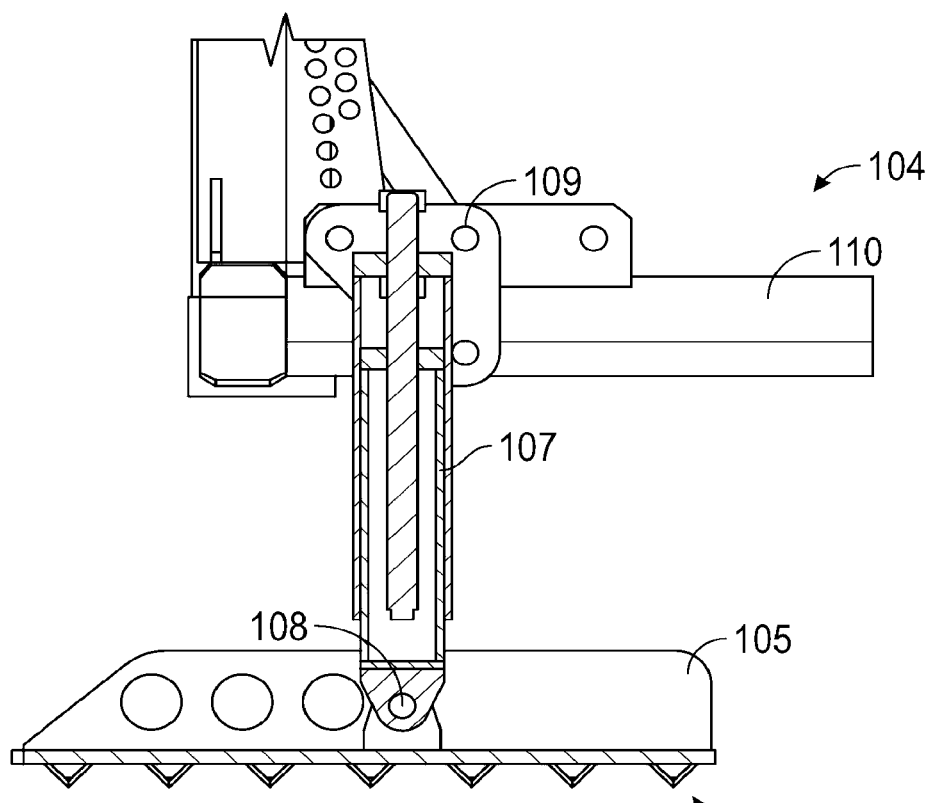
Figure 28C:
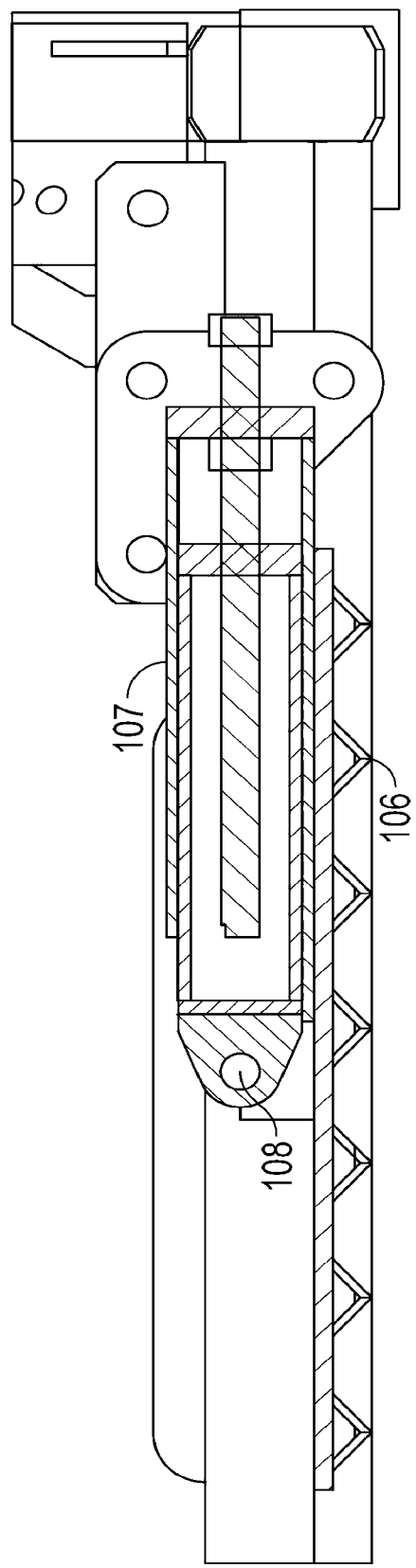

FIGS. 28(a)-(c) detail a preferred but non-limiting embodiment of such support legs 104, FIG. 28(a) illustrating an isometric view of the support leg structure, whilst FIG. 28(b) showing an elevational view thereof in the operational position, and FIG. 28(c) showing an elevational view thereof in the folded, or retracted position, suitable for transportation. The embodiment of the support leg shown in FIGS. 28(a)-(c) shows a plate-like member 105 which is adapted to be supported on a substrate surface, and which may optionally incorporate an abutment surface which is designed to inhibit movement when positioned on the substrate surface by means of having raised ribs or the like. The support leg itself 107 is preferably articulated about pivot point 108 such that it can move between the operational position as shown in FIG. 28(b) and the folded, or retracted position shown in FIG. 28(c) such that it may be compactly stored for transportation. A plate at the top of support leg 107, illustrated by the reference numeral 109 may be bolted or otherwise attached to the module 110 as will be appreciated by a person skilled in the art by bolts, pins, or the like.

Figure 29A:
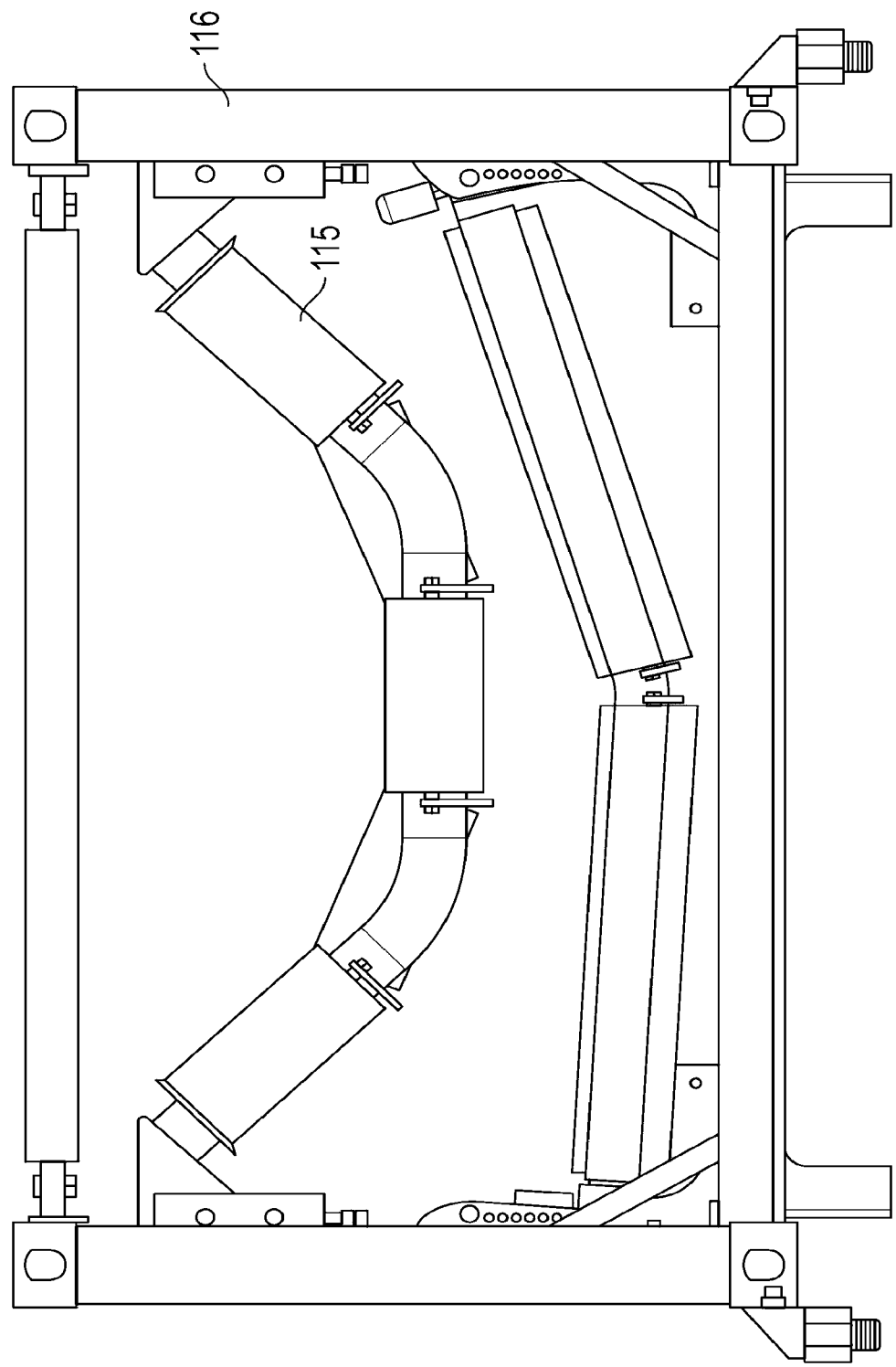
FIGS. 29(a) and 29(b) illustrate views of a conveyor module in which the internal componentry is installed in an angular or asymmetric manner if needed to suit a horizontal curve, so as to facilitate appropriate conveyance of material thereon around the curve or the like, FIG. 29(a) showing an end view of a conveyor module, and FIG. 29(b) showing an alternative end view of a conveyor assembly.
Figure 29B:
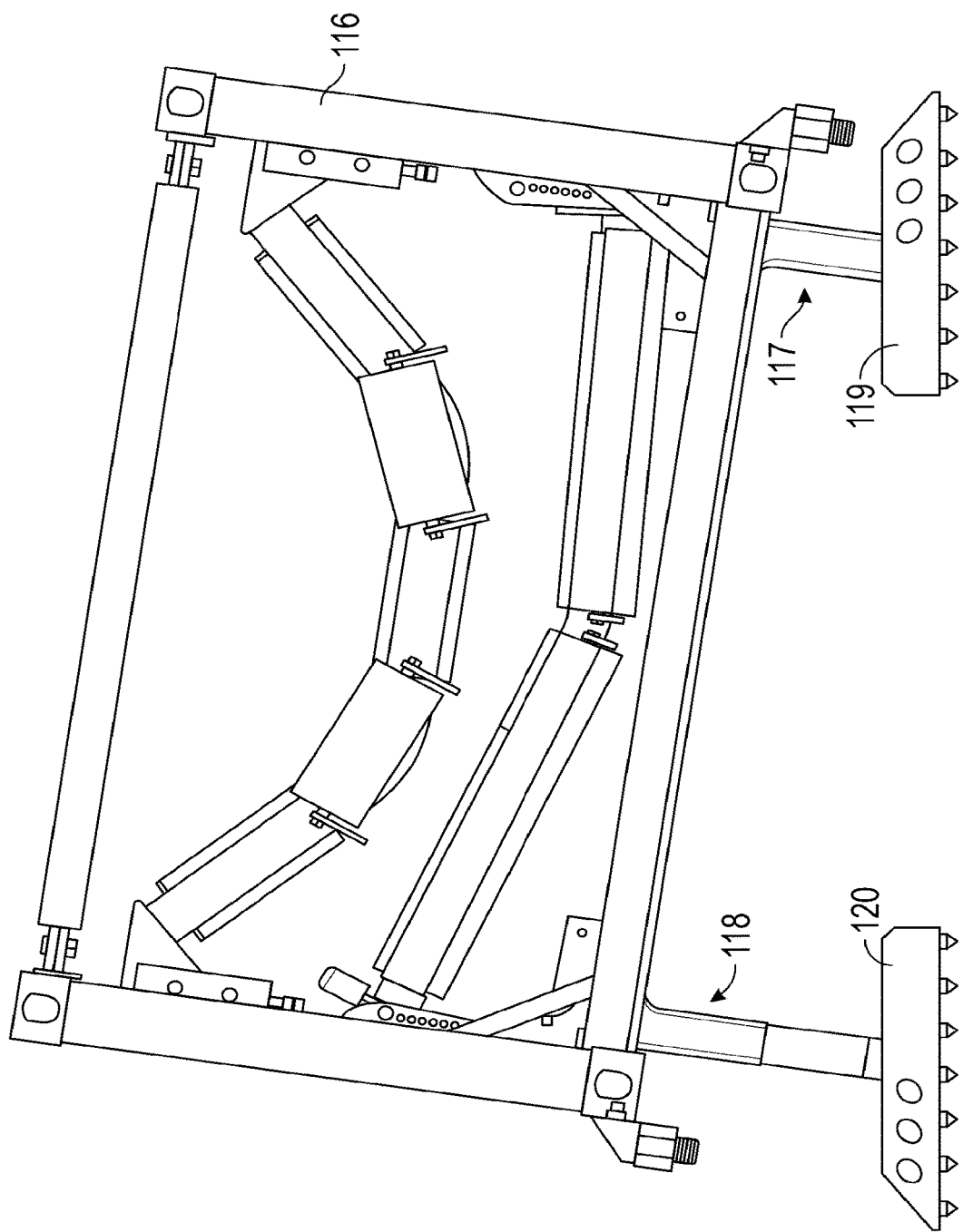

FIGS. 29(a)-(b) illustrate how the internal conveyor componentry 115 within the module 116 may be angularly positioned therein in an asymmetric manner or the like, so as to take into account desired curvature, for instance when the conveyor is intended to convey material around a curve or corner. FIG. 29(b) illustrates the modular container 116 in an angular disposition supported on support legs 117 and 118 above substrate plates 119 and 120 respectively. As will be appreciated by persons skilled in the art such angular disposition facilitates appropriate conveyance of the conveyed material on the conveyor, and the extent of angling is variable depending on site specifications, etc. Vertical curves are also possible, in that conveyor is able to go up and down grades of up to around 10 degrees. Compound curves where angulation in both horizontal and vertical planes is also possible.

Figure 30A:
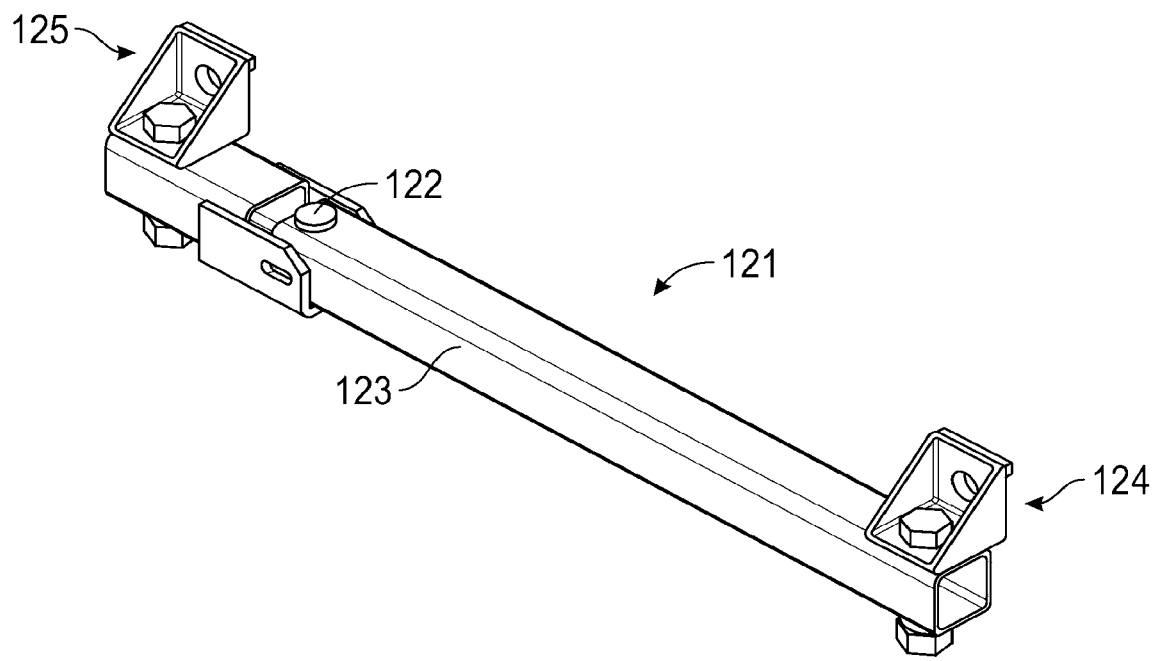
FIGS. 30(a) and 30(b) illustrate views of a connection arm, adapted to secure or interconnect adjacent modules, FIG. 30(a) showing the arm itself, and FIG. 30(b) showing it installed between a pair of modules.
Figure 30B:
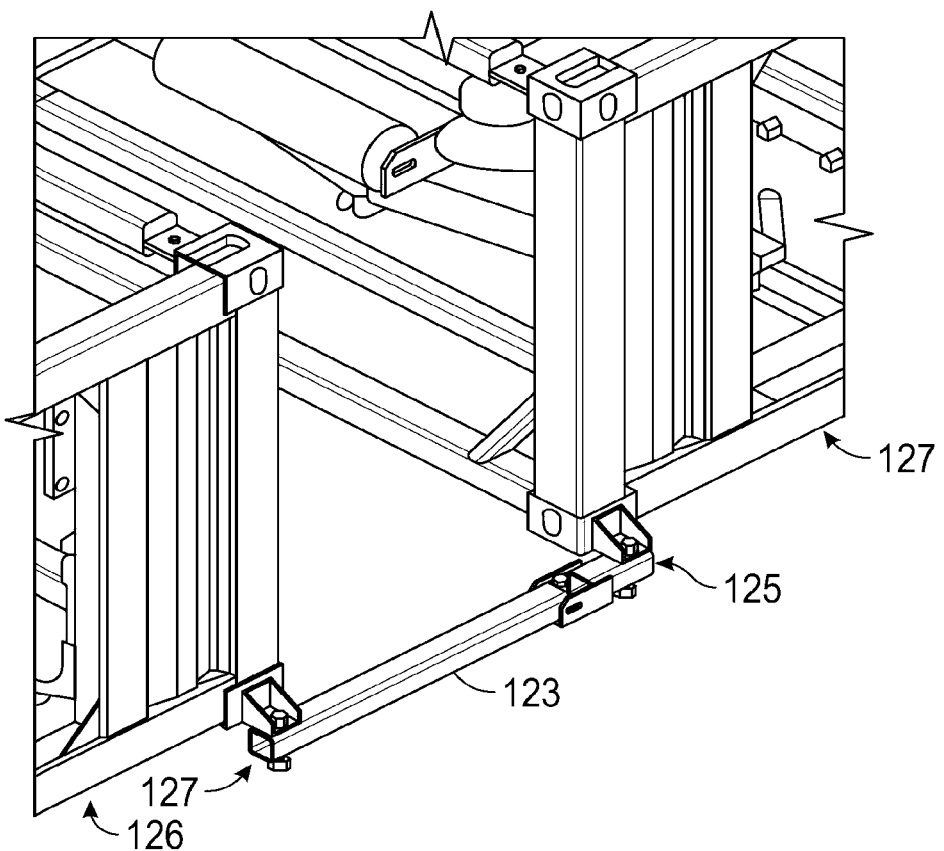

FIGS. 30(a)-(b) illustrate various views of a module connection arm, which is adapted to secure or interconnect adjacent modules.

The connection arm, illustrated by reference numeral 121 may typically be pivoted about a pivot point 122 and/or elongated using an extendible length arm 123 and incorporate appropriate connection members 124 and 125 for securement to a pair of modules 126 and 127 respectively, as illustrated in FIG. 30(b). It will be appreciated that a variety of different types of connection arms etc. may alternatively be used utilized.

Figure 31:
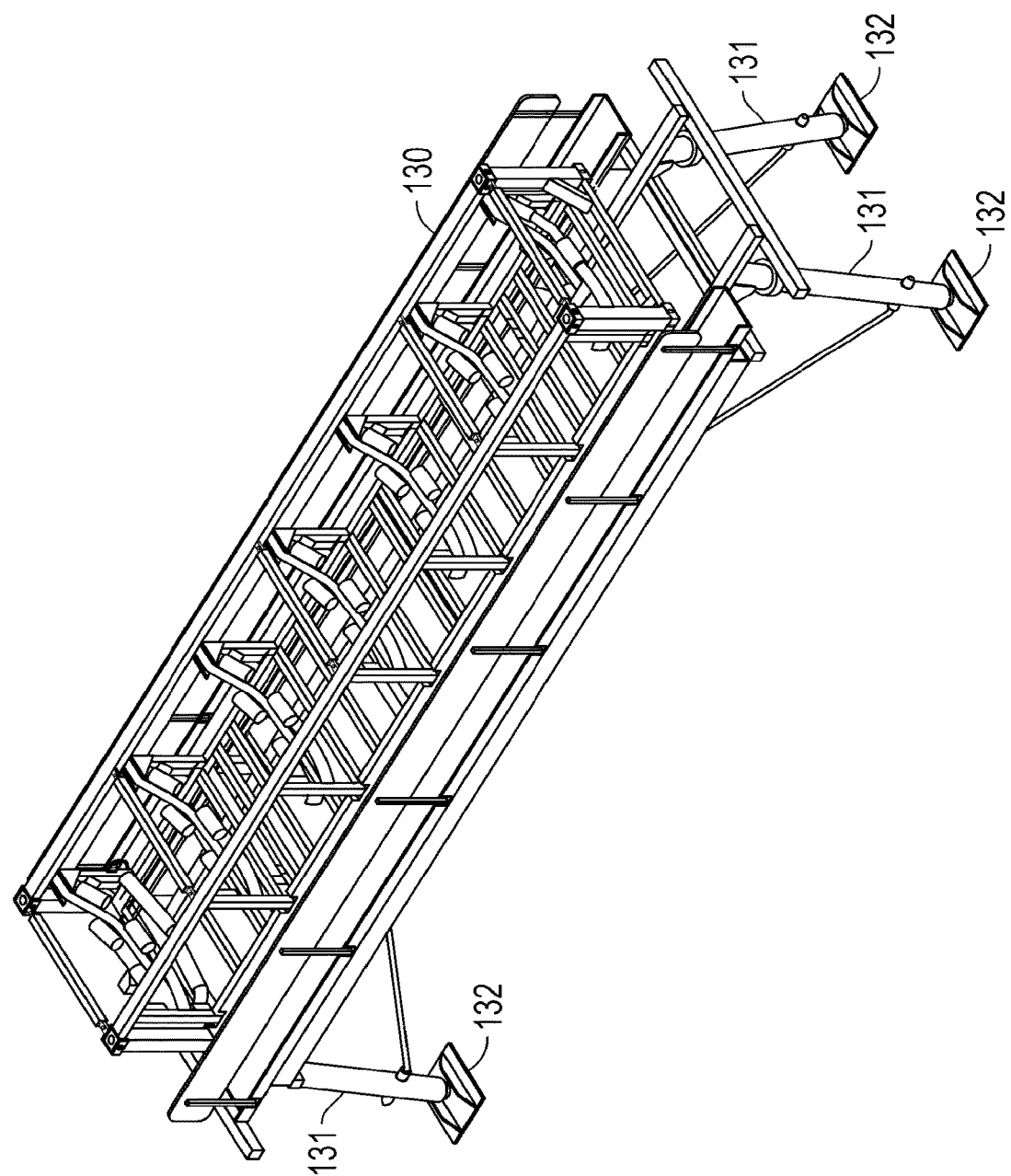
FIG. 31 illustrates how a module may be elevated from a substrate surface on elongated, elevated support legs.

In FIG. 31 is illustrated an elevated conveyor module, elevated from the substrate surface on elongated support legs. The module 130 is shown having four elongated legs 131 supported on substrate plates 132. The legs 131 may be of adjustable length, if desired, as will be understood by person skilled in the art.

Figure 32:
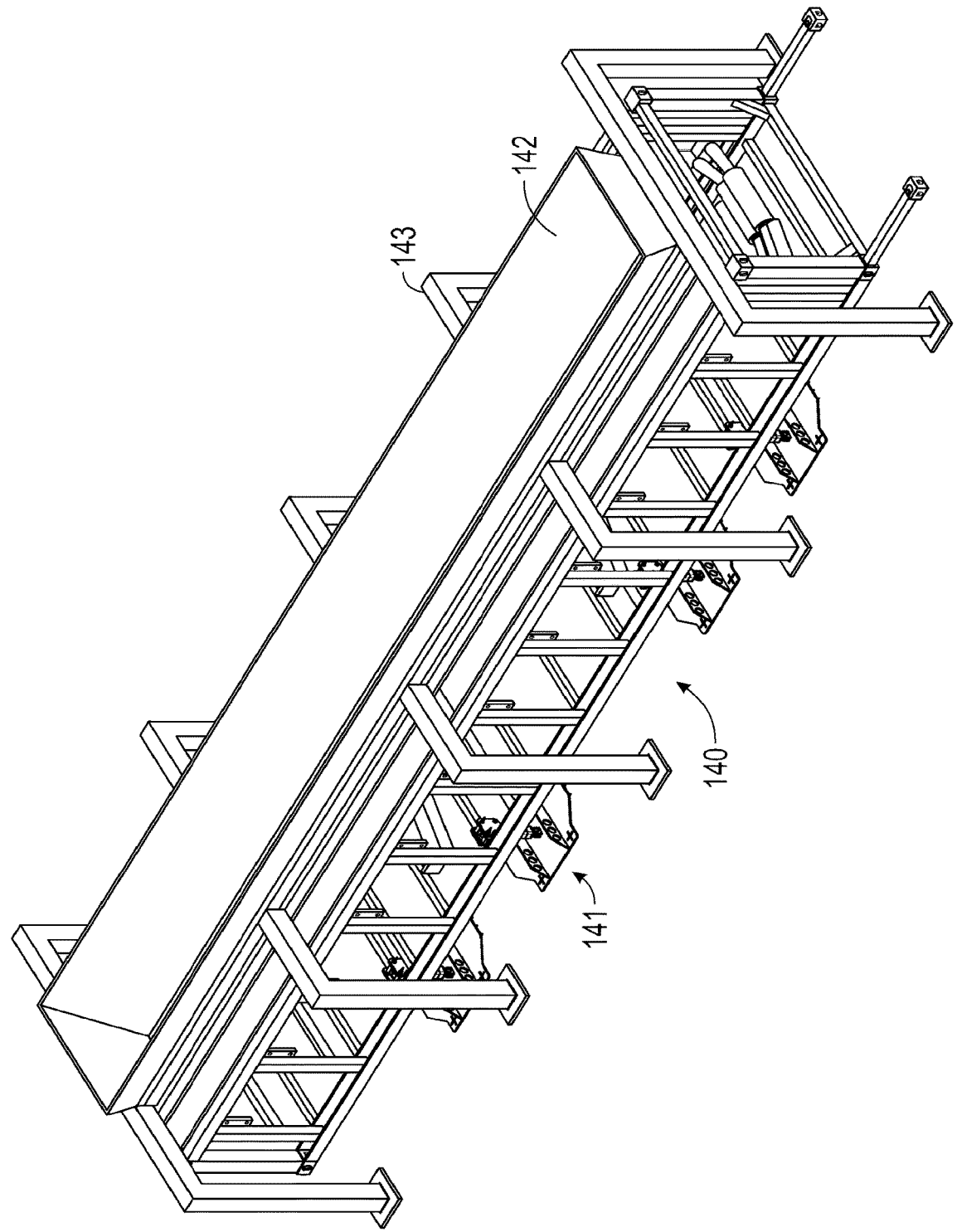
FIG. 32 illustrates how a loading hopper may be positioned over a conveyor module.

In FIG. 32 is illustrated how a hopper may be positioned over a conveyor module. The conveyor module 140 is shown supported on its various support legs 141, and the hopper 142 is shown having its own framework 143 to position it over the module. Various other components may likewise be installed, as desired. The Hopper can alternatively be an integral part of the conveyor module and bolted directly to structural elements.

It will be appreciated by persons skilled in the art that the module may be readily installed by being transported by ship, truck, train or other transportation modes and then, being appropriately craned into position.

Figure 33:
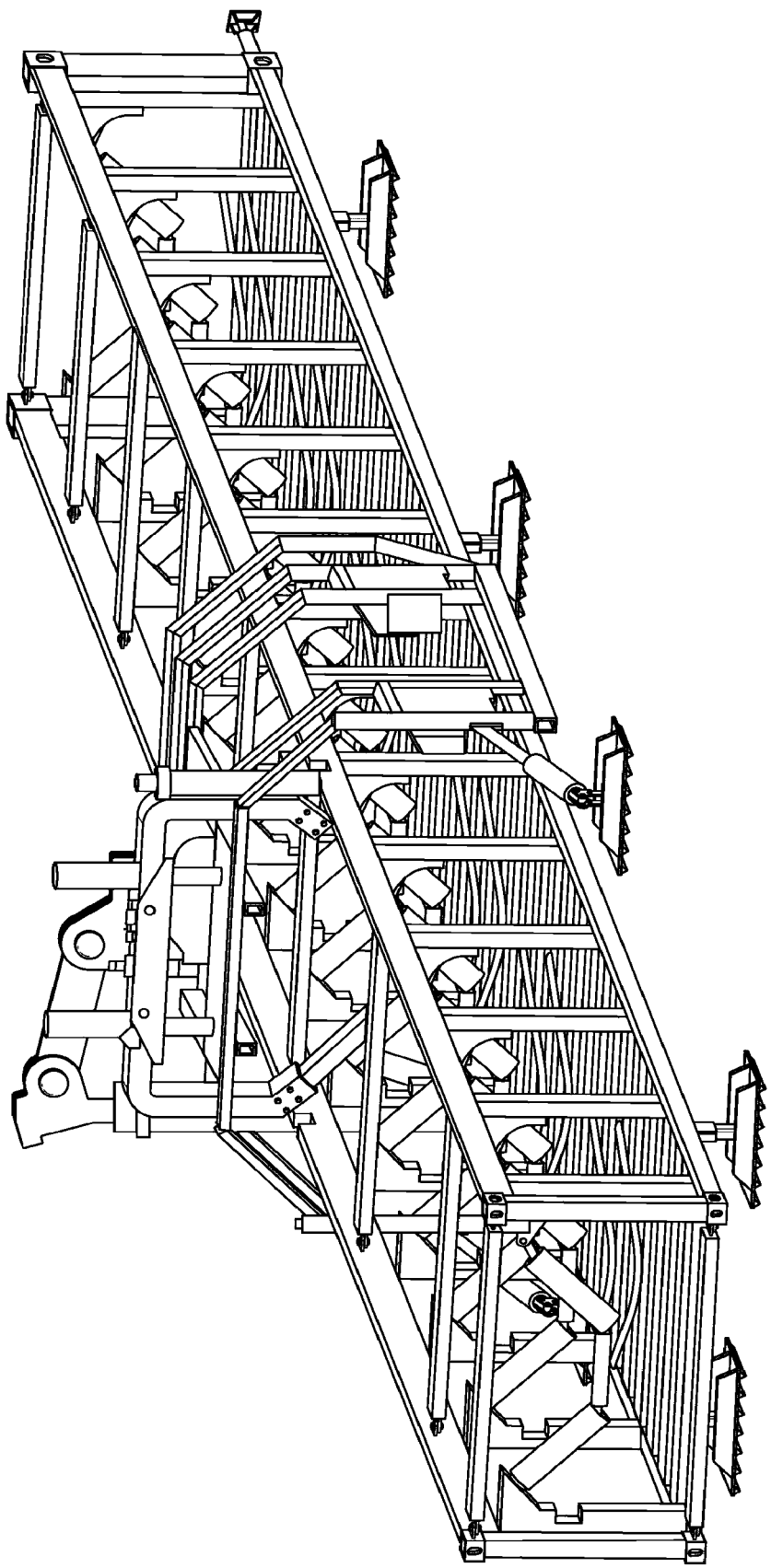
FIG. 33 illustrates how a module may be configured so that a robotic idler changing machine may travel along the top of the conveyor modules.

FIG. 33 shows a robotic idler changing machine adapted to travel along the top of a conveyor module 1. The robotic idler changing machine is adapted to lift a running conveyor belt with product clear of the idler rollers. Robotic arms can then remove damaged rollers and replace with new rollers in a safe manner whilst not disrupting productive time.

It will be appreciated that numerous other variations and modifications will become apparent to persons skilled in the art. All such variations and modifications should be considered to fall within the scope of the invention as broadly hereinbefore described and as hereinafter claimed.

The invention claimed is:

1. A conveyor module, interconnected in end-to-end relationship with at least one other conveyor module to thereby form a conveyor assembly, each conveyor module comprising:
   a substantially longitudinal main frame, which is of standardized shipping container (ISO) dimensions;
   a plurality of support legs, adapted to support said main frame upon a substrate surface, wherein each support leg is height adjustable to facilitate levelling adjustment of the module; and,
   conveyor belt componentry, comprising a plurality of conveyor idlers pre-assembled in spaced-apart arrangement within said longitudinal main frame, at least on of the conveyor idlers being adjustable within the main frame;
   wherein, in use, the pre-assembled module is adapted to be:
   transported to an installation location,
   interconnected to said at least one other module, in end-to-end relationship atop said substrate surface, to thereby form a composite conveyor assembly of any desired length; and,
   adjustably aligned, by adjustment of the support legs, to compensate for site curves, grades or other site specifications; and,
   provided with a conveyor belt collectively supported by the conveyor idlers of the interconnected modules, the position of the conveyor belt being adjustable by adjustment of the conveyor idlers inside the module to further compensate for site curves, grades and other site specifications which may affect belt tracking.

2. The conveyor module as claimed in claim 1, wherein at least one of said conveyor idlers includes an adjustable mounting to allow for horizontal or vertical adjustment of the conveyor idler, to compensate for site curves, grades and other site specifications.

* * * * *